United States Patent
Wang et al.

(10) Patent No.: US 11,750,253 B2
(45) Date of Patent: Sep. 5, 2023

(54) MULTI-BAND TRANSMITTER

(71) Applicant: QUALCOMM Incorporated, San Diego, CA (US)

(72) Inventors: Chuan Wang, San Diego, CA (US); Bhushan Shanti Asuri, San Diego, CA (US); Li Liu, San Diego, CA (US); Vinod Panikkath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/464,404

(22) Filed: Sep. 1, 2021

(65) Prior Publication Data

US 2023/0067837 A1     Mar. 2, 2023

(51) Int. Cl.
*H04B 1/02*        (2006.01)
*H04B 7/06*        (2006.01)
*H04B 1/04*        (2006.01)

(52) U.S. Cl.
CPC ......... *H04B 7/0602* (2013.01); *H04B 1/0483* (2013.01); *H04B 2001/0491* (2013.01)

(58) Field of Classification Search
CPC .. H04B 7/0602; H04B 7/0608; H04B 1/0483; H04B 1/04; H04B 1/40; H04B 2001/0416; H04B 1/16
See application file for complete search history.

(56) References Cited

U.S. PATENT DOCUMENTS

| | | | | |
|---|---|---|---|---|
| 10,454,596 | B2 * | 10/2019 | Mow | H04B 17/14 |
| 10,516,432 | B2 * | 12/2019 | Tseng | H04B 1/44 |
| 2016/0248451 | A1 | 8/2016 | Weissman et al. | |
| 2020/0106473 | A1 | 4/2020 | Rong et al. | |
| 2020/0295450 | A1 | 9/2020 | Park et al. | |

FOREIGN PATENT DOCUMENTS

WO     2020197691 A1     10/2020

OTHER PUBLICATIONS

International Search Report and Written Opinion—PCT/US2022/040079—ISA/EPO—Dec. 2, 2022.

* cited by examiner

*Primary Examiner* — Nhan T Le
(74) *Attorney, Agent, or Firm* — Loza & Loza QUALCOMM Incorporated

(57) ABSTRACT

In certain aspects, a method includes receiving a first intermediate frequency (IF) signal and a second IF signal via a common input, upconverting the first IF signal into a first radio frequency (RF) signal, transmitting the first RF signal via a first antenna array, upconverting the second IF signal into a second RF signal, and transmitting the second RF signal via a second antenna array. In a first transit mode, the first RF signal is in a first frequency band and the second RF signal is in a second frequency band, and, in a second transmit mode, the first RF signal and the second RF signal are both in the first frequency band.

28 Claims, 13 Drawing Sheets

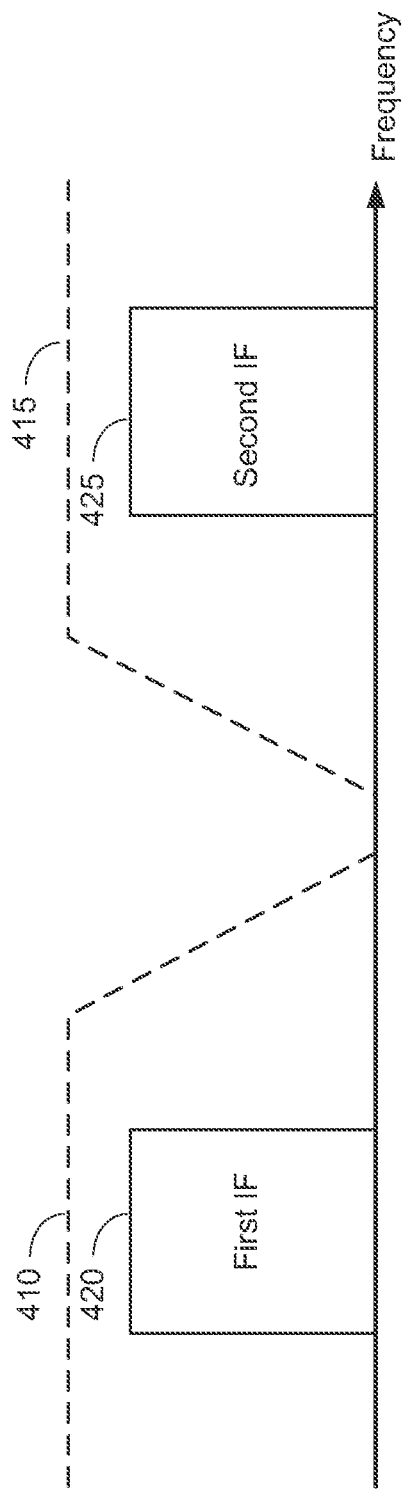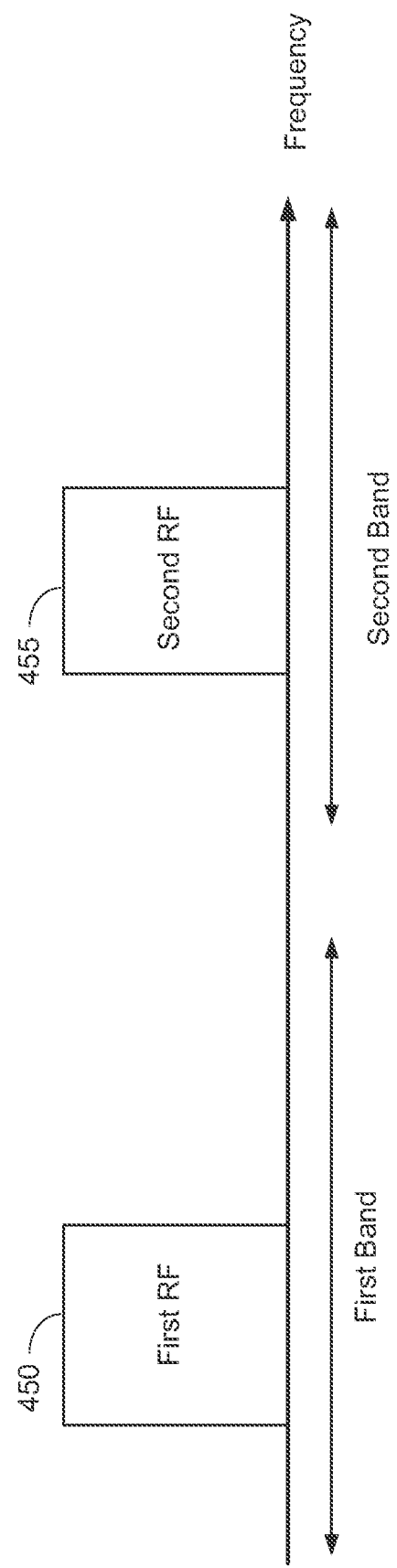

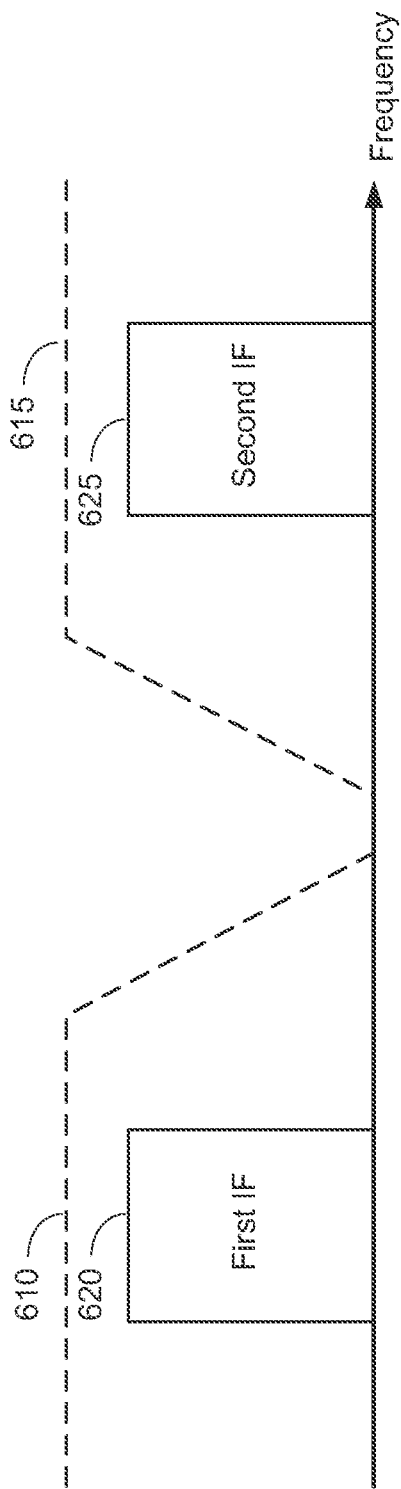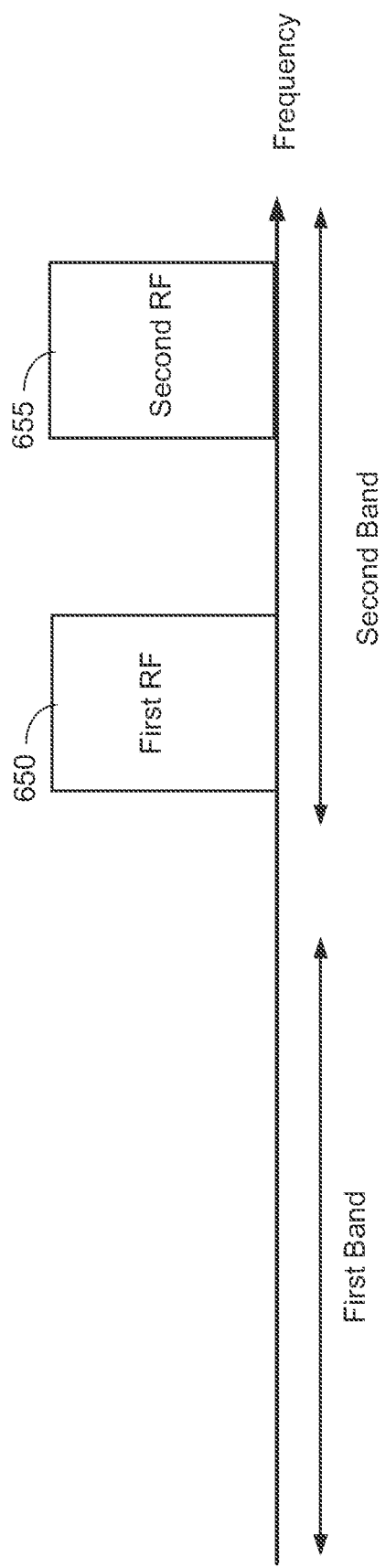
FIG. 6A
FIG. 6B

MULTI-BAND TRANSMITTER

BACKGROUND

Field

Aspects of the present disclosure relate generally to wireless communications, and more particularly, to multi-band transmitters.

Background

Wireless communications systems are widely deployed to provide various types of communication content such as voice, video, packet data, messaging, broadcast, and so on. A wireless communications system (e.g., a fifth generation (5G) system) may operate in a millimeter wave (mmWave) band (e.g., above 24 GHz) to increase bandwidth and data rates. The wireless communications system may also employ beamforming to improve link budgets and system capacity.

SUMMARY

The following presents a simplified summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

A first aspect relates to an apparatus. The apparatus includes a first signal path having an input and an output, wherein the input of the first signal path is coupled to an intermediate frequency (IF) input, and the first signal path comprises a first filter configured to pass a first IF signal and suppress a second IF signal. The apparatus also includes a second signal path having an input and an output, wherein the input of the second signal path is coupled to the IF input, and the second signal path comprises a second filter configured to pass the second IF signal and suppress the first IF signal. The apparatus also includes a first transmitter array having an input and multiple outputs, a second transmitter array having an input and multiple outputs, a third transmitter array having an input and multiple outputs, and a first power distribution network (PDN) having a first input, a second input, a first output coupled to the input of the first transmitter array, and a second output coupled to the input of the third transmitter array. The apparatus further includes a first mixer coupled between the output of the first signal path and the first input of the first PDN, a second mixer coupled between the output of the second signal path and the input of the second transmitter array, and a third mixer coupled between the output of the second signal path and the second input of the first PDN.

A second aspects relates to a method for transmission. The method includes receiving a first intermediate frequency (IF) signal and a second IF signal via a common input, upconverting the first IF signal into a first radio frequency (RF) signal, transmitting the first RF signal via a first antenna array, upconverting the second IF signal into a second RF signal, and transmitting the second RF signal via a second antenna array. In a first transit mode, the first RF signal is in a first frequency band and the second RF signal is in a second frequency band, and, in a second transmit mode, the first RF signal and the second RF signal are both in the first frequency band.

A third aspect relates to an apparatus, comprising. The apparatus includes a first signal path having an input and an output, wherein the first signal path comprises a first filter, and a second signal path having an input and an output, wherein the second signal path comprises a second filter, and the input of the first signal path and the input of the second signal path are coupled to a common input. The apparatus also includes a first transmitter array having an input and multiple outputs, a second transmitter array having an input and multiple outputs, a third transmitter array having an input and multiple outputs, a first mixer coupled to the output of the first signal path, a second mixer coupled to the output of the second signal path, and a third mixer coupled to the output of the second signal path. The apparatus further includes means for coupling the first mixer to the input of the first transmitter array in a first transmit mode and a second transmit mode, means for coupling the second mixer to the input of the second transmitter array in the first transmit mode, and means for coupling the third mixer to the input of the third transmitter array in the second transmit mode.

BRIEF DESCRIPTION OF THE DRAWINGS

FIG. 4A illustrates an example of intermediate frequency (IF) signals in the multi-band transmit system in a first transmit mode according to certain aspects of the present disclosure.

FIG. 4B illustrates an example of radio frequency (RF) signals in the multi-band transmit system in the first transmit mode according to certain aspects of the present disclosure.

FIG. 6A illustrates an example of IF signals in the multi-band transmit system in a third transmit mode according to certain aspects of the present disclosure.

FIG. 6B illustrates an example of RF signals in the multi-band transmit system in the third transmit mode according to certain aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
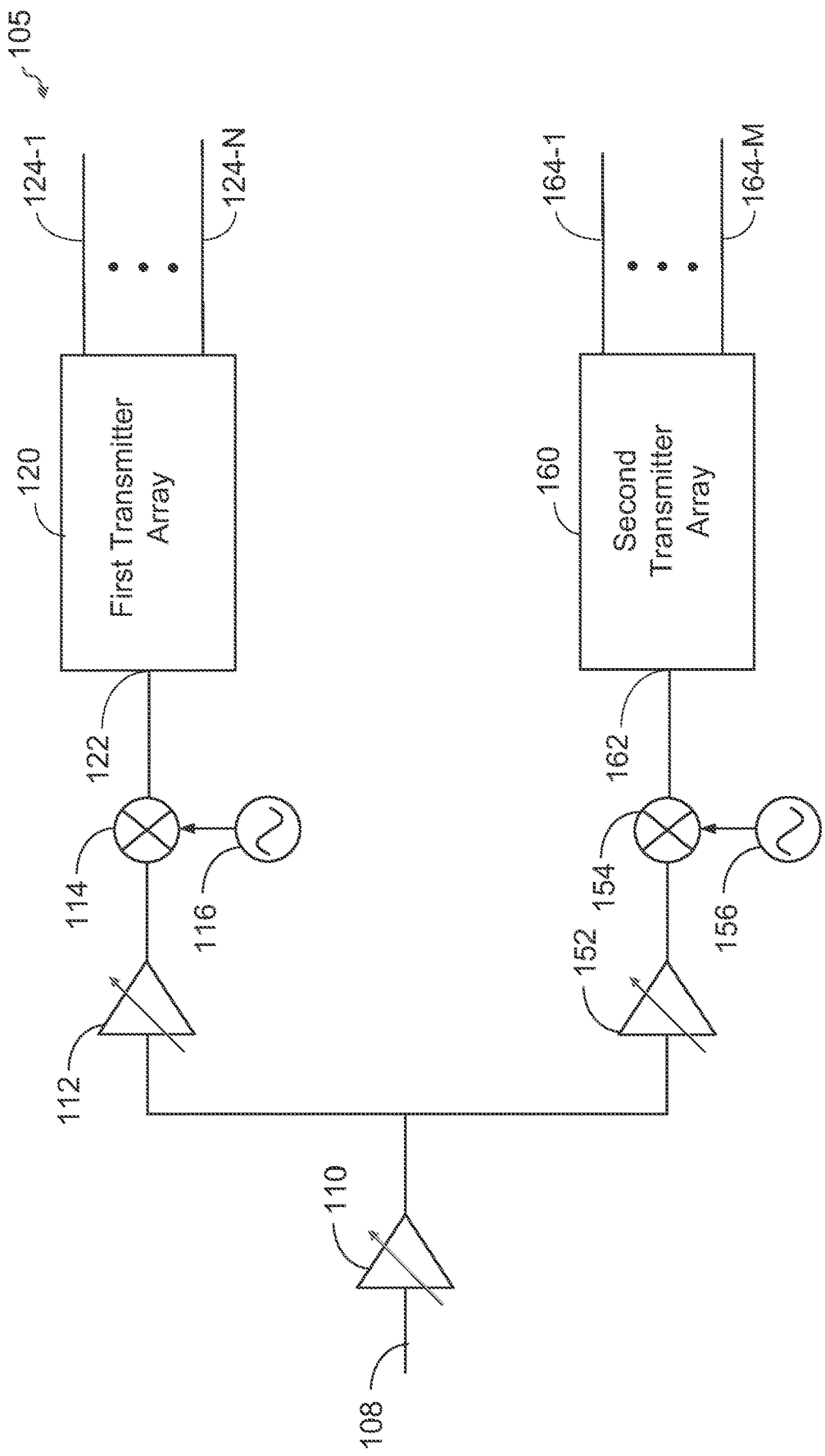
FIG. 1 shows an example of a transmit system according to certain aspects of the present disclosure.

FIG. 1 shows an example of a transmit system 105 according to certain aspects. The transmit system 105 may be used for transmitting radio frequency (RF) signals in a mmWave band (e.g., above 24 GHz). In the example shown in FIG. 1, the transmit system 105 includes a first amplifier 110, a second amplifier 112, a third amplifier 152, a first mixer 114, a second mixer 154, a first frequency synthesizer 116, a second frequency synthesizer 156, a first transmitter array 120, and a second transmitter array 160.

As discussed further below, the first transmitter array 120 is configured to transmit RF signals in a first frequency band (hereinafter "first band") and the second transmitter array 160 is configured to transmit RF signals in a second frequency band (hereinafter "second band"). Herein, a frequency band may also refer to a subband or a band group. The first band and the second band are in the mmWave band (e.g., above 24 GHz). In one example, the first band may be within a frequency range of 24 GHz to 29 GHz and the second band may be within a frequency range of 37 GHz to 48 GHz. However, it is to be appreciated that the present disclosure is not limited to this example, and that the first band and the second band may be within other frequency ranges. In one example, the first band includes a low band and the second band includes a high band, in which the lowest frequency in the high band is higher than the highest frequency in the low band.

In the example shown in FIG. 1, the input of the first amplifier 110 is coupled to an input 108 of the transmit system 105. In one example, the input 108 of the transmit system 105 is configured to receive intermediate frequency (IF) signals, as discussed further below. The second amplifier 112 and the first mixer 114 are coupled in series in a first signal path between the output of the first amplifier 110 and the input 122 of the first transmitter array 120. The first frequency synthesizer 116 is coupled to the first mixer 114 and is configured to generate a first local oscillator (LO) signal. The first frequency synthesizer 116 outputs the first LO signal to the first mixer 114 for frequency upconverting IF signals received at the input 108 to RF signals in the first band (e.g., low band).

The third amplifier 152 and the second mixer 154 are coupled in series in a second signal path between the output of the first amplifier 110 and the input 162 of the second transmitter array 160. The second frequency synthesizer 156 is coupled to the second mixer 154 and is configured to generate a second signal LO signal. The second frequency synthesizer 156 outputs the second LO signal to the second mixer 154 for frequency upconverting IF signals received at the input 108 to RF signals in the second band (e.g., high band).

In certain aspects, the second amplifier 112 and the third amplifier 152 may be omitted. In these aspects, the transmit system 105 may include a power distribution network configured to distribute the IF signals from the output of the first amplifier 110 to the first mixer 114 and the second mixer 154.

Figure 2:
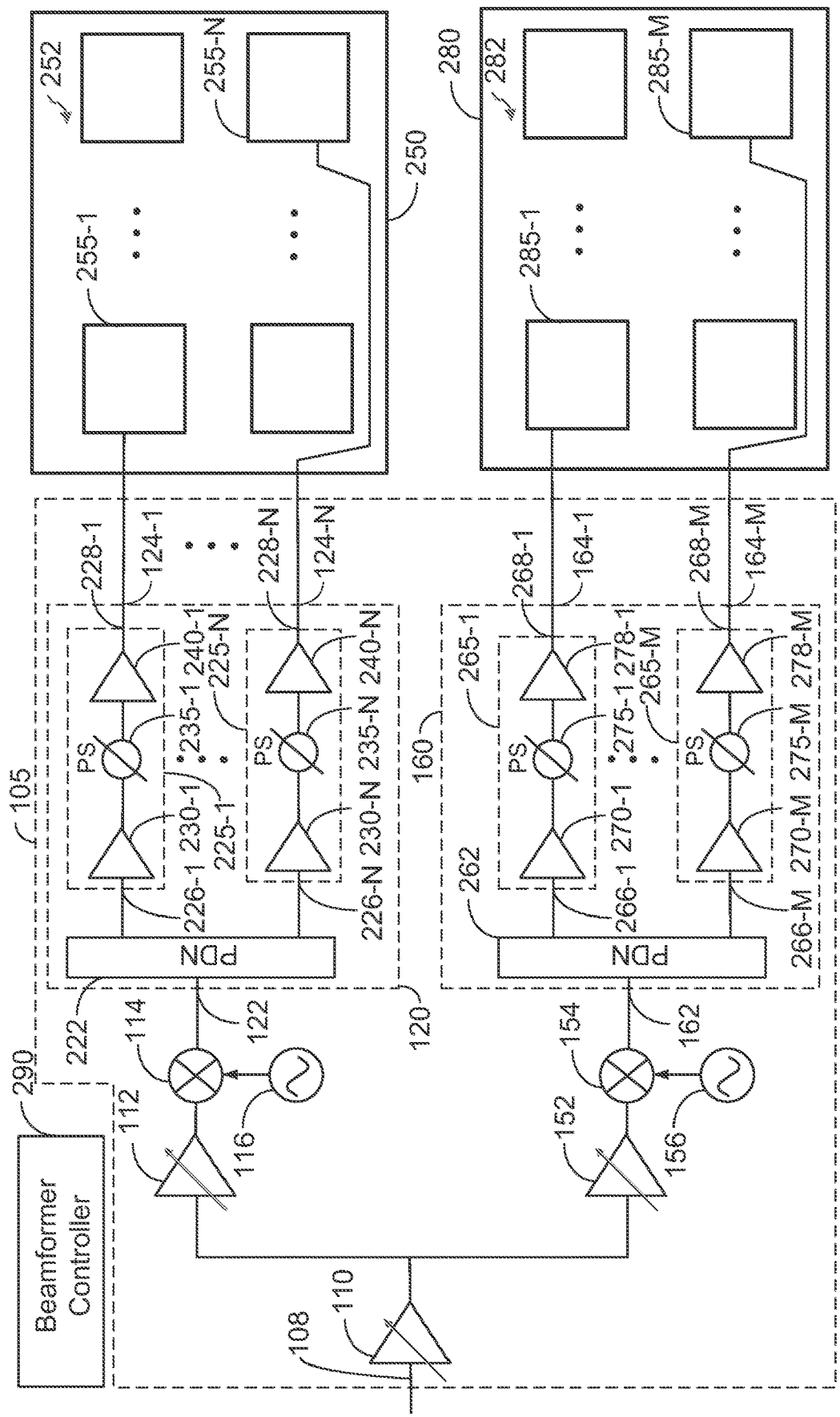
FIG. 2 shows an example of antenna arrays coupled to the transmit system according to certain aspects of the present disclosure.

The first transmitter array 120 has multiple outputs 124-1 to 124-N, in which each of the outputs 124-1 to 124-N may be coupled to a respective antenna in a first antenna array 252 (shown in FIG. 2). The first transmitter array 120 is configured to receive an RF signal in the first band (e.g., low band) from the first mixer 114, generate RF signals based on the received RF signal, and output each of the RF signals at a respective one of the outputs 124-1 to 124-N. As discussed further below, the first transmitter array 120 may adjust the phases between the RF signals using beamforming to electronically steer a transmit beam of the first antenna array 252.

The second transmitter array 160 has multiple outputs 164-1 to 164-M, in which each of the outputs 164-1 to 164-M may be coupled to a respective antenna in a second antenna array 282 (shown in FIG. 2). The number of outputs 164-1 to 164-M for the second transmitter array 160 may be equal to or different from the number of outputs 124-1 to 124-N for the first transmitter array 120 (i.e., M=N or M≠N). The second transmitter array 160 is configured to receive an RF signal in the second band (e.g., high band) from the second mixer 154, generate RF signals based on the received RF signal, and output each of the RF signals at a respective one of the outputs 164-1 to 164-M. As discussed further below, the second transmitter array 160 may adjust the phases between the RF signals using beamforming to electronically steer a transmit beam of the second antenna array 282.

FIG. 2 shows an exemplary implementation of the first transmitter array 120 and the second transmitter array 160 according to certain aspects. In this example, the first transmitter array 120 is coupled to the first antenna array 252, which includes antennas 255-1 to 255-N (also referred to as antenna elements) on a substrate 250. Each of the antennas 255-1 to 255-N may be implemented with a patch antenna or another type of antenna, which may be formed on or mounted on the substrate 250. In this example, each output 124-1 to 124-N of the first transmitter array 120 is coupled to a respective one of the antennas 255-1 to 255-N.

In this example, the first transmitter array 120 includes a power distribution network (PDN) 222 (also referred to as a divider or a splitter) and multiple transmit chains 225-1 to 225-N. The PDN 222 has an input coupled to the input 122 of the first transmitter array 120 and multiple outputs. The PDN 222 is configured to receive a RF signal at its input and split the RF signal into multiple RF signals at its outputs. Each of the transmit chains 225-1 to 225-N has an input 226-1 to 226-N coupled to a respective one of the outputs of the PDN 222 and an output 228-1 to 228-N coupled to a respective one of the outputs 124-1 to 124-N of the first transmitter array 120. The PDN 222 may include amplifiers (not shown), for example, to increase the power of the multiple RF signals before the multiple RF signals are output to the transmit chains 225-1 to 225-N.

In the example shown in FIG. 2, each of the transmit chains 225-1 to 225-N includes a respective amplifier 230-1 to 230-N (e.g., variable gain amplifier), a respective phase shifter 235-1 to 235-N, and a respective power amplifier 240-1 to 240-N. Each of the phase shifters 235-1 to 235-N is configured to shift the phase of the respective RF signal by a respective phase shift. The phase shifters 235-1 to 235-N are used to set the transmit beam direction of the first antenna array 252. In this regard, a beamformer controller 290 sets the phase shifts of the phase shifters 235-1 to 235-N to achieve the desired transmit beam direction. For ease of illustration, the individual connections between the beamformer controller 290 and the phase shifters 235-1 to 235-N are not shown in FIG. 2.

In the example shown in FIG. 2, the second transmitter array 160 is coupled to the second antenna array 282, which includes antennas 285-1 to 285-M (also referred to as antenna elements) on a substrate 280. Each of the antennas 285-1 to 285-M may be implemented with a patch antenna or another type of antenna, which may be formed on or mounted on the substrate 280. In this example, each output 164-1 to 164-M of the second transmitter array 160 is coupled to a respective one of the antennas 285-1 to 285-M.

In this example, the second transmitter array 160 includes a PDN 262 (also referred to as a divider or a splitter) and multiple transmit chains 265-1 to 265-M. The PDN 262 has an input coupled to the input 162 of the second transmitter array 160 and multiple outputs. The PDN 262 is configured to receive a RF signal at its input and split the RF signal into multiple RF signals at its outputs. Each of the transmit chains 265-1 to 265-M has an input 266-1 to 266-M coupled to a respective one of the outputs of the PDN 262 and an output 268-1 to 268-M coupled to a respective one of the outputs 164-1 to 164-M of the second transmitter array 160. The PDN 262 may include amplifiers (not shown), for example, to increase the power of the multiple RF signals before the multiple RF signals are output to the transmit chains 265-1 to 265-M.

In the example shown in FIG. 2, each of the transmit chains 265-1 to 265-M includes a respective amplifier 270-1 to 270-M (e.g., variable gain amplifier), a respective phase shifter 275-1 to 275-M, and a respective power amplifier 278-1 to 278-M. Each of the phase shifters 275-1 to 275-M is configured to shift the phase of the respective RF signal by a respective phase shift. The phase shifters 275-1 to 275-M are used to set the transmit beam direction of the second antenna array 282. In this regard, the beamformer controller 290 sets the phase shifts of the phase shifters 275-1 to 275-M to achieve the desired transmit beam direction. For ease of illustration, the individual connections between the beamformer controller 290 and the phase shifters 275-1 to 275-M are not shown in FIG. 2.

In this example, the first transmitter array 120 transmits signals via the first antenna array 252 in the first band (e.g., low band) and the second transmitter array 160 transmits signals via the second antenna array 282 in the second band (e.g., high band). Thus, the transmit system 105 can only operate each of the antenna arrays 252 and 282 is a single band (i.e., the first antenna array 252 in the first band and the second antenna array 282 in the second band). Consequently, the transmit system 105 does not support a configuration where both antenna arrays 252 and 282 operate in the first band or a configuration where both antenna arrays 252 and 282 operate in the second band.

In addition, the transmit system 105 can only operate in one of the first band and the second band at a time. This is because the transmit system 105 does not have a mechanism for separating IF signals for the first band and IF signals for the second band. As a result, the transmit system 105 needs to receive IF signals for the first band and IF signals for the second band one at a time. Consequently, the transmit system 105 is not capable of simultaneously transmitting signals in the first band and the second band.

Figure 3:
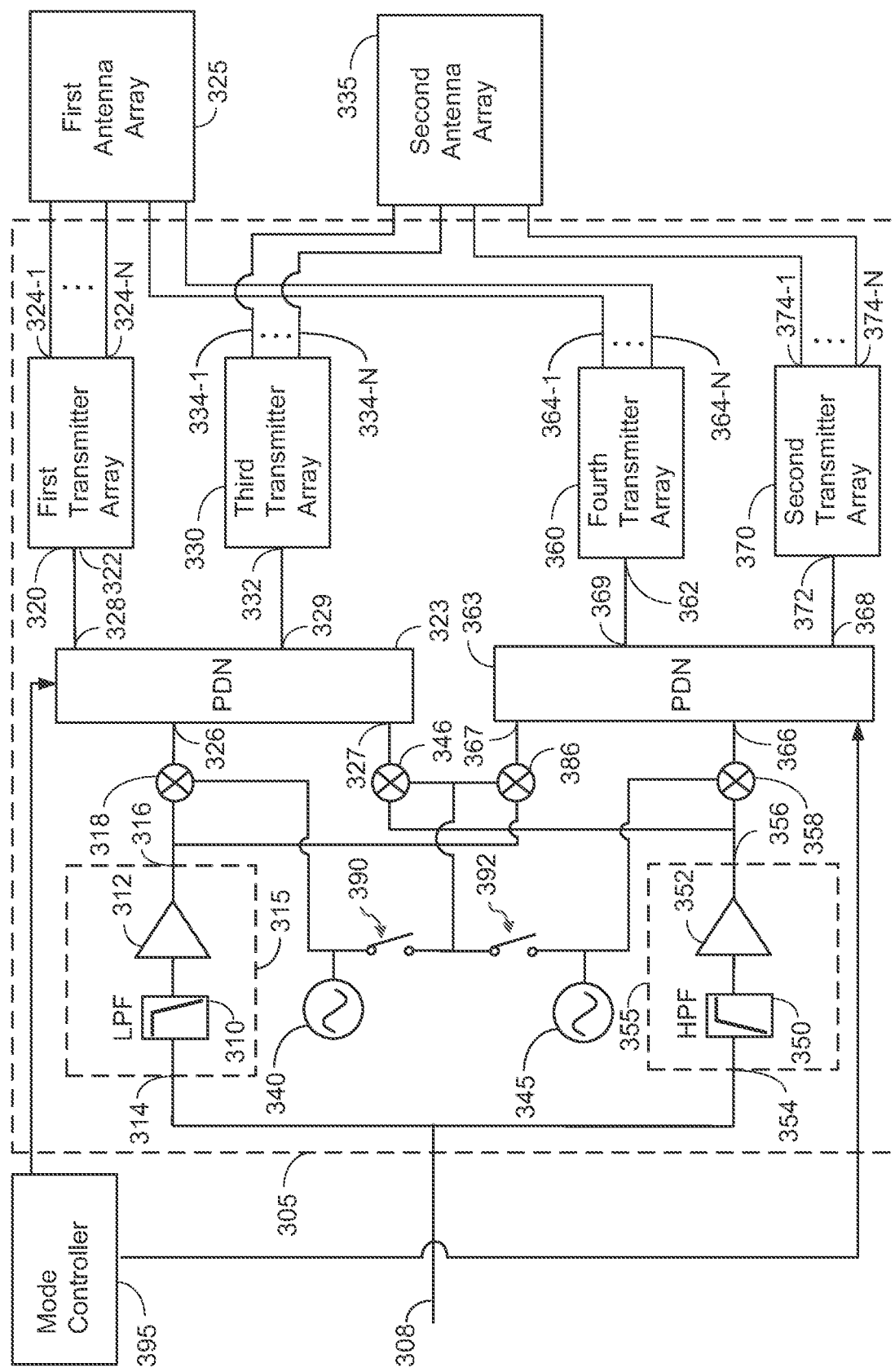
FIG. 3 shows an example of a multi-band transmit system according to certain aspects of the present disclosure.

FIG. 3 shows an exemplary multi-band transmit system 305 according to certain aspects. The multi-band transmit system 305 may be used to transmit RF signals in a mmWave band (e.g., above 24 GHz). In some implementations, the multi-band transmit system 305 is integrated on a chip. The multi-band transmit system 305 may be used in a user equipment (UE), a base station, or another type of wireless device for transmitting RF signals. The multi-band transmit system 305 has an IF input 308 configured to receive IF signals (e.g., from an IF circuit on chip or off chip). As discussed further below, the multi-band transmit system 305 overcomes one or more of the limitations of the transmit system 105.

In the example shown in FIG. 3, the multi-band transmit system 305 includes a first signal path 315 and a second signal path 355. The first signal path 315 may include a first filter 310 and a first amplifier 312 coupled in series, and the second signal path 355 may include a second filter 350 and a second amplifier 352 coupled in series. As discussed further below, the first filter 310 and the second filter 350 may be configured to separate IF signals received at the input 308. In one example, the first filter 310 and the second filter 350 may be configured to separate IF signals for different bands, allowing the multi-band transmit system 305 to simultaneously transmit RF signals in multiple bands (e.g., the first band and the second band discussed above). In the example in FIG. 3, the first filter 310 is implemented with a low-pass filter (LPF), and the second filter 350 is implemented with a high-pass filter (HPF). However, it is to be appreciated that the first filter 310 and the second filter 350 are not limited to this example, as discussed further below.

In the example shown in FIG. 3, the multi-band transmit system 305 also includes a first frequency synthesizer 340, a second frequency synthesizer 345, a first switch 390, a second switch 392, a first mixer 318, a second mixer 358, a third mixer 346, and a fourth mixer 386. As discussed further below, the first switch 390 and the second switch 392 allow a mode controller 395 to selectively switch (i.e., configure) the multi-band transmit system 305 to any one of multiple transmit modes.

In the example shown in FIG. 3, the multi-band transmit system 305 further includes a first transmitter array 320, a second transmitter array 370, a third transmitter array 330, and a fourth transmitter array 360. In certain aspects, the first transmitter array 320 and the third transmitter array 330 are each configured to transmit signals in the first band, and the second transmitter array 370 and the fourth transmitter array 360 are each configured to transmit signals in the second band. The first band and the second band may both be in the mmWave band (e.g., above 24 GHz). In one example, the first band may be within a frequency range of 24 GHz to 29 GHz and the second band may be within a frequency range of 37 GHz to 48 GHz. However, it is to be appreciated that the present disclosure is not limited to this example, and that the first band and the second band may be within other frequency ranges.

The multi-band transmit system 305 may also include a first PDN 323 having a first input 326, a second input 327, a first output 328, and a second output 329. The first input 326 is coupled to the output of the first mixer 318 and the second input 327 is coupled to the output of the third mixer 346. The first output 328 is coupled to the input 322 of the first transmitter array 320 and the second output 329 is coupled to the input 332 of the third transmitter array 330.

In this example, the first PDN 323 is a reconfigurable PDN coupled to the mode controller 395. The first PDN 323 is configured to selectively couple the first input 326 or the second input 327 to the second output 329 under the control of the mode controller 395. As discussed further below, this allows the mode controller 395 to reconfigure the first PDN 323 for different transmit modes. The first PDN 323 may also couple the first input 326 to the first output 328. An exemplary implementation of the first PDN 323 is discussed below with reference to FIG. 7A.

The multi-band transmit system 305 may also include a second PDN 363 having a first input 366, a second input 367, a first output 368, and a second output 369. The first input 366 is coupled to the output of the second mixer 358 and the second input 367 is coupled to the output of the fourth mixer 386. The first output 368 is coupled to the input 372 of the second transmitter array 370 and the second output 369 is coupled to the input 362 of the fourth transmitter array 360. In this example, the second PDN 363 is a reconfigurable PDN coupled to the mode controller 395. The second PDN 363 is configured to selectively couple the first input 366 or the second input 367 to the second output 369 under the control of the mode controller 395. As discussed further below, this allows the mode controller 395 to reconfigure the second PDN 363 for the different transmit modes. The second PDN 363 may also couple the first input 366 to the first output 368. An exemplary implementation of the second PDN 363 is discussed below with reference to FIG. 7A.

The input 308 of the multi-band transmit system 305 is configured to receive IF signals. For example, the input 308 may be coupled to an IF circuit (not shown in FIG. 3) configured to frequency upconvert baseband signals from a baseband processor into the IF signals, and output the IF signals to the input 308. The IF signals may include IF signals for different bands (e.g., the first band and the second band) in which the IF signals for the different bands may be separated by the first filter 310 and the second filter 350, as discussed further below.

In the example shown in FIG. 3, the input 314 of the first signal path 315 is coupled to the input 308 and the output 316 of the first signal path 315 is coupled to the first mixer 318. The first filter 310 and the first amplifier 312 are coupled in series in the first signal path 315 between the input 314 and the output 316. The first mixer 318 is coupled between the output 316 of the first signal path 315 and the first input 326 of the first PDN 323. It is to be appreciated that, in some implementations, the first signal path 315 may include one or more additional devices not shown in FIG. 3 such as an additional filter and/or an additional amplifier. In this example, the first frequency synthesizer 340 is coupled to the first mixer 318. As discussed further below, the first frequency synthesizer 340 is configured to generate and output a first LO signal. The first frequency synthesizer 340 may include one or more phase locked loops (PLLs). In certain aspects, the first frequency synthesizer 340 may be configured to adjust (i.e., tune) the frequency of the first LO signal under the control of the mode controller 395.

In the example shown in FIG. 3, the input 354 of the second signal path 355 is coupled to the input 308 and the output 356 of the second signal path 355 is coupled to the second mixer 358. The second filter 350 and the second amplifier 352 are coupled in series in the second signal path 355 between the input 354 and the output 356. The second mixer 358 is coupled between the output 356 of the second signal path 355 and the first input 366 of the second PDN 363. It is to be appreciated that, in some implementations, the second signal path 355 may include one or more additional devices not shown in FIG. 3. In this example, the second frequency synthesizer 345 is coupled to the second mixer 358. As discussed further below, the second frequency synthesizer 345 is configured to generate and output a second LO signal. The second frequency synthesizer 345 may include one or more PLLs. In certain aspects, the second frequency synthesizer 345 may be configured to adjust (i.e., tune) the frequency of the second LO signal under the control of the mode controller 395.

In the example shown in FIG. 3, the third mixer 346 is coupled between the output 356 of the second signal path 355 and the second input 327 of the first PDN 323, and the second switch 392 is coupled between the second frequency synthesizer 345 and the third mixer 346. Also, the fourth mixer 386 is coupled between the output 316 of the first signal path 315 and the second input 367 of the second PDN 363, and the first switch 390 is coupled between the first frequency synthesizer 340 and the fourth mixer 386.

The first transmitter array 320 has multiple outputs 324-1 to 324-N, in which each of the outputs 324-1 to 324-N may be coupled to a respective antenna (not shown in FIG. 3) in a first antenna array 325. The first transmitter array 320 is configured to receive an RF signal in the first band (e.g., low band) from the first mixer 318 via the first PDN 323, generate RF signals based on the received RF signal, and output each of the RF signals at a respective one of the outputs 324-1 to 324-N. As discussed further below, the first transmitter array 320 may adjust the phases between the RF signals using beamforming to electronically steer a transmit beam of the first antenna array 325.

The second transmitter array 370 has multiple outputs 374-1 to 374-N, in which each of the outputs 374-1 to 374-N may be coupled to a respective antenna (not shown in FIG. 3) in a second antenna array 335. The second transmitter array 370 is configured to receive an RF signal in the second band (e.g., high band) from the second mixer 358 via the second PDN 363, generate RF signals based on the received RF signal, and output each of the RF signals at a respective one of the outputs 374-1 to 374-N. As discussed further below, the second transmitter array 370 may adjust the phases between the RF signals using beamforming to electronically steer a transmit beam of the second antenna array 335.

The third transmitter array 330 has multiple outputs 334-1 to 334-N, in which each of the outputs 334-1 to 334-N may be coupled to a respective antenna (not shown in FIG. 3) in the second antenna array 335. The third transmitter array 330 is configured to receive an RF signal in the first band (e.g., low band) from the first mixer 318 or the third mixer 346 via the first PDN 323, generate RF signals based on the received RF signal, and output each of the RF signals at a respective one of the outputs 334-1 to 334-N. As discussed further below, the third transmitter array 330 may adjust the phases between the RF signals using beamforming to electronically steer a transmit beam of the second antenna array 335. In this example, each antenna in the second antenna array 335 may be coupled to a respective one of the outputs 374-1 to 374-N of the second transmitter array 370 and a respective one of the outputs 334-1 to 334-N of the third transmitter array 330, in which each antenna may be a multi-band antenna configured to transmit in the first band and the second band.

The fourth transmitter array 360 has multiple outputs 364-1 to 364-N, in which each of the outputs 364-1 to 364-N may be coupled to a respective antenna (not shown in FIG. 3) in the first antenna array 325. The fourth transmitter array 360 is configured to receive an RF signal in the second band (e.g., high band) from the second mixer 358 or the fourth mixer 386 via the second PDN 363, generate RF signals based on the received RF signal, and output each of the RF signals at a respective one of the outputs 364-1 to 364-N. As discussed further below, the fourth transmitter array 360 may adjust the phases between the RF signals using beamforming to electronically steer a transmit beam of the first antenna array 325. In this example, each antenna in the first antenna array 325 may be coupled to a respective one of the outputs 324-1 to 324-N of the first transmitter array 320 and a respective one of the outputs 364-1 to 364-N of the fourth transmitter array 360, in which each antenna may be a multi-band antenna configured to transmit in the first band and the second band.

As discussed above, the transmit system 305 can be selectively switched (i.e., configured) to operate in any one of multiple transmit modes by the mode controller 395. In this regard, exemplary transmit modes will now be described according to various aspects of the present disclosure.

In a first transmit mode, the transmit system 305 simultaneously transmits RF signals in the first band and the second band. In the first transmit mode, the mode controller 395 opens the first switch 390 and opens the second switch 392. In this mode, the input 308 of the transmit system 305 receives a first IF signal for the first band and a second IF signal for the second band simultaneously (e.g., from an IF circuit). FIG. 4A illustrates an example of the first IF signal 420 and the second IF signal 425 on a frequency plot. As shown in FIG. 4A, the first IF signal 420 and the second IF signal 425 have different frequencies, allowing the first IF signal 420 and the second IF signal 425 to be separated using filtering. In one example, the first filter 310 is implemented with an LPF having the exemplary frequency response 410 shown in FIG. 4A and the second filter 350 is implemented with a HPF having the exemplary frequency response 415 shown in FIG. 4A. In this example, the first filter 310 has a cutoff frequency above a frequency of the first IF signal 420 and the second filter 350 has a cutoff frequency below a frequency of the second IF signal 425. As a result, the first filter 310 passes the first IF signal 420 and suppresses the second IF signal 425, and the second filter 350 passes the second IF signal 425 and suppresses the first IF signal 420. This may be done, for example, to avoid disturbance between signals in the first band and the second band, suppress emissions generated from other bands, and/or maintain 3GPP-compatible linearity. In this example, the cutoff frequency of the first filter 310 may be referred to as a first cutoff frequency and the cutoff frequency of the second filter 350 may be referred to as a second cutoff frequency.

As used herein, a cutoff frequency (also referred to as a corner frequency) may be defined as a frequency at which a filter attenuates a signal by −3 dB. Also, as used herein, a filter suppresses a signal when the filter attenuates the signal by at least −3 dB.

The first frequency synthesizer 340 generates the first LO signal to upconvert the first IF signal 420 to a desired first RF signal 450 (shown in FIG. 4B) at the first mixer 318. In this example, the first RF signal 450 is in the first band (e.g., low band). The first RF signal 450 is coupled to the input 322 of the first transmitter array 320 via the first PDN 323. This is because the first input 326 of the first PDN 323 is coupled to the first output 328 of the first PDN 323 in this example. The first transmitter array 320 transmits the first RF signal 450 via the first antenna array 325.

In certain aspects, the third transmitter array 330 may also receive the first RF signal 450 via the first PDN 323 and transmit the first RF signal 450 via the second antenna array 335. In this example, the mode controller 395 reconfigures (i.e., causes) the first PDN 323 to couple the first input 326 to the second output 329 (which is coupled to the input 332 of the third transmitter array 330). Thus, in this example, the first RF signal 450 may be transmitted via the first antenna array 325 and the second antenna array 335 for increased antenna gain and increased effective isotropic radiated power (EIRP).

The second frequency synthesizer 345 generates the second LO signal to upconvert the second IF signal 425 to a desired second RF signal 455 (shown in FIG. 4B) at the second mixer 358. In this example, the second RF signal 455 is in the second band (e.g., high band). It is to be appreciated that the spacing between the first IF signal 420 and the second IF signal 425 may be different from the spacing between the first RF signal 450 and the second RF signal 455. The second RF signal 455 is coupled to the input 372 of the second transmitter array 370 via the second PDN 363. This is because the first input 366 of the second PDN 363 is coupled to the first output 368 of the second PDN 363 in this example. The second transmitter array 370 transmits the second RF signal 455 via the second antenna array 335.

In certain aspects, the fourth transmitter array 360 may also receive the second RF signal 455 via the second PDN 363 and transmit the second RF signal 455 via the first antenna array 325. In this example, the mode controller 395 reconfigures (i.e., causes) the second PDN 363 to couple the first input 366 to the second output 369 (which is coupled to the input 362 of the fourth transmitter array 360). Thus, in this example, the second RF signal 455 may be transmitted via the first antenna array 325 and the second antenna array 335 for increased antenna gain and increased effective isotropic radiated power (EIRP).

Figure 5A:
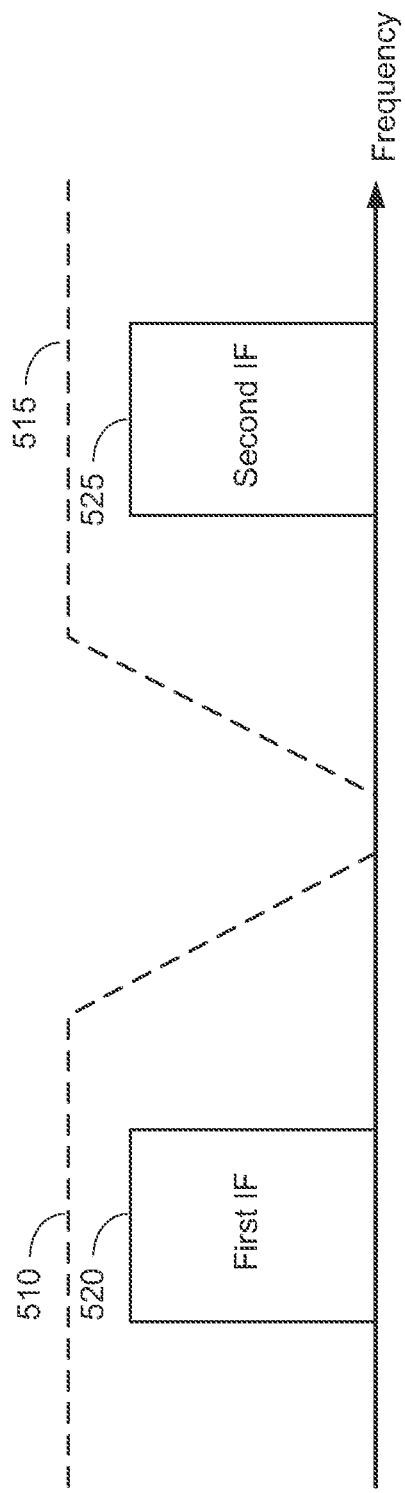
FIG. 5A illustrates an example of IF signals in the multi-band transmit system in a second transmit mode according to certain aspects of the present disclosure.

In a second transmit mode, the transmit system 305 simultaneously transmits RF signals in the first band. In the second transmit mode, the mode controller 395 opens the first switch 390 and closes the second switch 392. In this mode, the input 308 of the transmit system 305 receives a first IF signal and a second IF signal simultaneously (e.g., from an IF circuit). FIG. 5A illustrates an example of the first IF signal 520 and the second IF signal 525 on a frequency plot in which the first IF signal 520 and the second IF signal 525 have different frequencies. FIG. 5A also shows an exemplary frequency response 510 of the first filter 310 and an exemplary frequency response 515 of the second filter 350 for the example in which the first filter 310 is implemented with a LPF having a cutoff frequency above the first IF signal 520 and the second filter 350 is implemented with a HPF having a cutoff frequency below the second IF signal 525. In this example, the first filter 310 passes the first IF signal 520 in the first signal path 315 while suppressing the second IF signal 525, and the second filter 350 passes the second IF signal 525 in the second signal path 355 while suppressing the first IF signal 520.

Figure 5B:
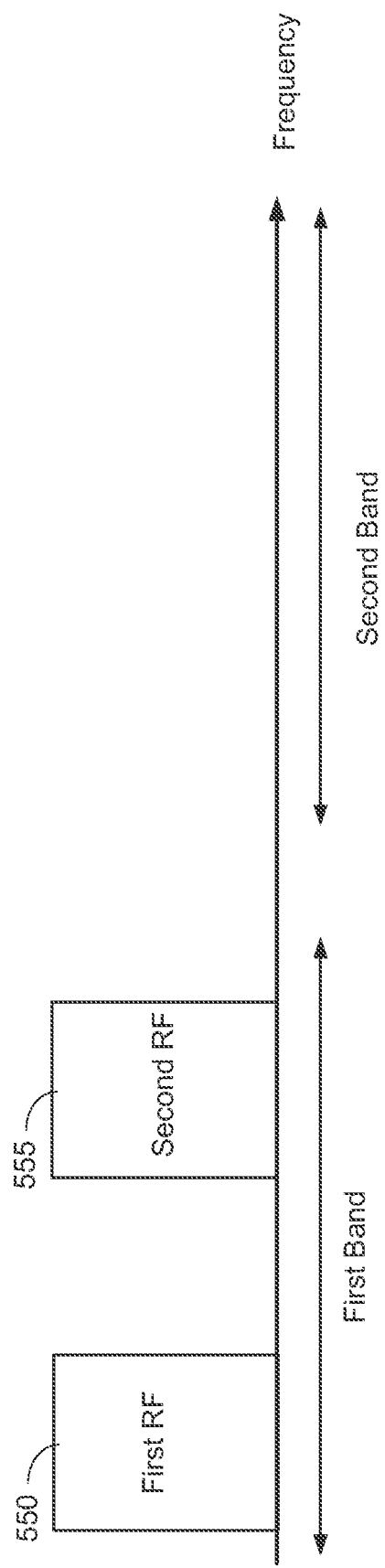
FIG. 5B illustrates an example of RF signals in the multi-band transmit system in the second transmit mode according to certain aspects of the present disclosure.

The first frequency synthesizer 340 generates the first LO signal to upconvert the first IF signal 520 to a desired first RF signal 550 (shown in FIG. 5B) at the first mixer 318. In this example, the first RF signal 550 is in the first band (e.g., low band). The frequency of the first LO signal may be different in the second transmit mode than the first transmit mode. The first RF signal 550 is coupled to the input 322 of the first transmitter array 320 via the first PDN 323, and the first transmitter array 320 transmits the first RF signal 550 via the first antenna array 325. This is because the first input 326 of the first PDN 323 is coupled to the first output 328 of the first PDN 323 in this example.

The second frequency synthesizer 345 generates the second LO signal to upconvert the second IF signal 525 to a desired second RF signal 555 (shown in FIG. 5B) at the third mixer 346, which is coupled to the second frequency synthesizer 345 via the second switch 392 (which is closed in the second transmit mode). In this example, the second RF signal 555 is in the first band (e.g., low band) and may be separated from the first RF signal 550 in frequency within the first band. The frequency of the second LO signal may be different in the second transmit mode than the first transmit mode. In this regard, the mode controller 395 may adjust the frequency of the second LO output by the second frequency synthesizer 345 when switching the transmit system 305 to the second transmit mode so that the second RF signal 555 is in the first band.

In the second transmit mode, the second RF signal 555 is coupled to the input 332 of the third transmitter array 330 via the first PDN 323 and the third transmitter array 330 transmits the second RF signal 555 via the second antenna array 335. To do this, the mode controller 395 reconfigures (i.e., causes) the first PDN 323 to couple the second input 327 (which is coupled to the third mixer 346) to the second output 329 (which is coupled to the third transmitter array 330).

In a third transmit mode, the transmit system 305 simultaneously transmits RF signals in the second band. In the third transmit mode, the mode controller 395 closes the first switch 390 and opens the second switch 392. In this mode, the input 308 of the transmit system 305 receives a first IF signal and a second IF signal simultaneously (e.g., from an IF circuit). FIG. 6A illustrates an example of the first IF signal 620 and the second IF signal 625 on a frequency plot in which the first IF signal 620 and the second IF signal 625 have different frequencies. FIG. 6A also shows an exemplary frequency response 610 of the first filter 310 and an exemplary frequency response 615 of the second filter 350 for the example in which the first filter 310 is implemented with a LPF having a cutoff frequency above the first IF signal 620 and the second filter 350 is implemented with an HPF having a cutoff frequency below the second IF signal 625. In this example, the first filter 310 passes the first IF signal 620 in the first signal path 315 while suppressing the second IF signal 625, and the second filter 350 passes the second IF signal 625 in the second signal path 355 while suppressing the first IF signal 620.

The first frequency synthesizer 340 generates the first LO signal to upconvert the first IF signal 620 to a desired first RF signal 650 (shown in FIG. 6B) at the fourth mixer 386, which is coupled to the first frequency synthesizer 340 via the first switch 390 (which is closed in the third transmit mode). In this example, the first RF signal 650 is in the second band. The frequency of the first LO signal may be different in the third transmit mode than the first transmit mode and the second transmit mode. In this regard, the mode controller 395 may adjust the frequency of the first LO output by the first frequency synthesizer 340 when switching the transmit system 305 to the third transmit mode so that the first RF signal 650 is in the second band.

The first RF signal 650 is coupled to the input 362 of the fourth transmitter array 360 via the second PDN 363, and the fourth transmitter array 360 transmits the first RF signal 650 via the first antenna array 325. To do this, the mode controller 395 reconfigures (i.e., causes) the second PDN 363 to couple the second input 367 (which is coupled to the fourth mixer 386) to the second output 369 (which is coupled to the fourth transmitter array 360).

The second frequency synthesizer 345 generates the second LO signal to upconvert the second IF signal 625 to a desired second RF signal 655 (shown in FIG. 6B) at the second mixer 358. In this example, the second RF signal 655 is in the second band. The second RF signal 655 is coupled to the input 372 of the second transmitter array 370 via the second PDN 363, and the second transmitter array 370 transmits the second RF signal 655 via the second antenna array 335. This is because the first input 366 of the second PDN 363 is coupled to the first output 368 of the second PDN 363 in this example.

Thus, unlike the transmit system 105 shown in FIG. 1, the multi-band transmit system 305 supports simultaneous multi-band transmissions in the first band and the second band (e.g., in the first transmit mode). The multi-band transmit system 305 also supports simultaneous transmissions in the first band (e.g., in the second transmit mode) and simultaneous transmissions in the second band (e.g., in the third transmit mode).

In the examples in FIGS. 4A, 5A and 6A, the first filter 310 is implemented with an LPF and the second filter 350 is implemented with an HPF. However, it is to be appreciated that the first filter 310 and the second filter 350 are not limited to these examples. For example, in other implementations, the first filter 310 and/or the second filter 350 may each be implemented with notch a filter, a bandpass filter, or another type of filter capable of separating IF signals at different frequencies. For example, the first filter 310 may be implemented with a bandpass filter in which the first IF signal is within the pass band of the first filter 310 and the second IF signal is outside the pass band of the first filter 310. Similarly, the second filter 350 may be implemented with a bandpass filter in which the second IF signal is within the pass band of the second filter 350 and the first IF signal is outside the pass band of the second filter 350. In this example, the pass band of the first filter 310 may be referred to as a first pass band and the pass band of the second filter 350 may be referred to as a second pass band.

In certain aspects, the transmit system 305 may operate in a carrier aggregation (CA) mode in which the transmit system 305 simultaneously transmits data using multiple carriers (also referred to as component carriers). In one example, the mode controller 395 may operate the transmit system 305 in the CA mode during the first transmit mode, in which the first RF signal is used to transmit data in one or more of the carriers in the first band and the second RF signal is used to transmit data in one or more other ones of the carriers in the second band.

Figure 7A:
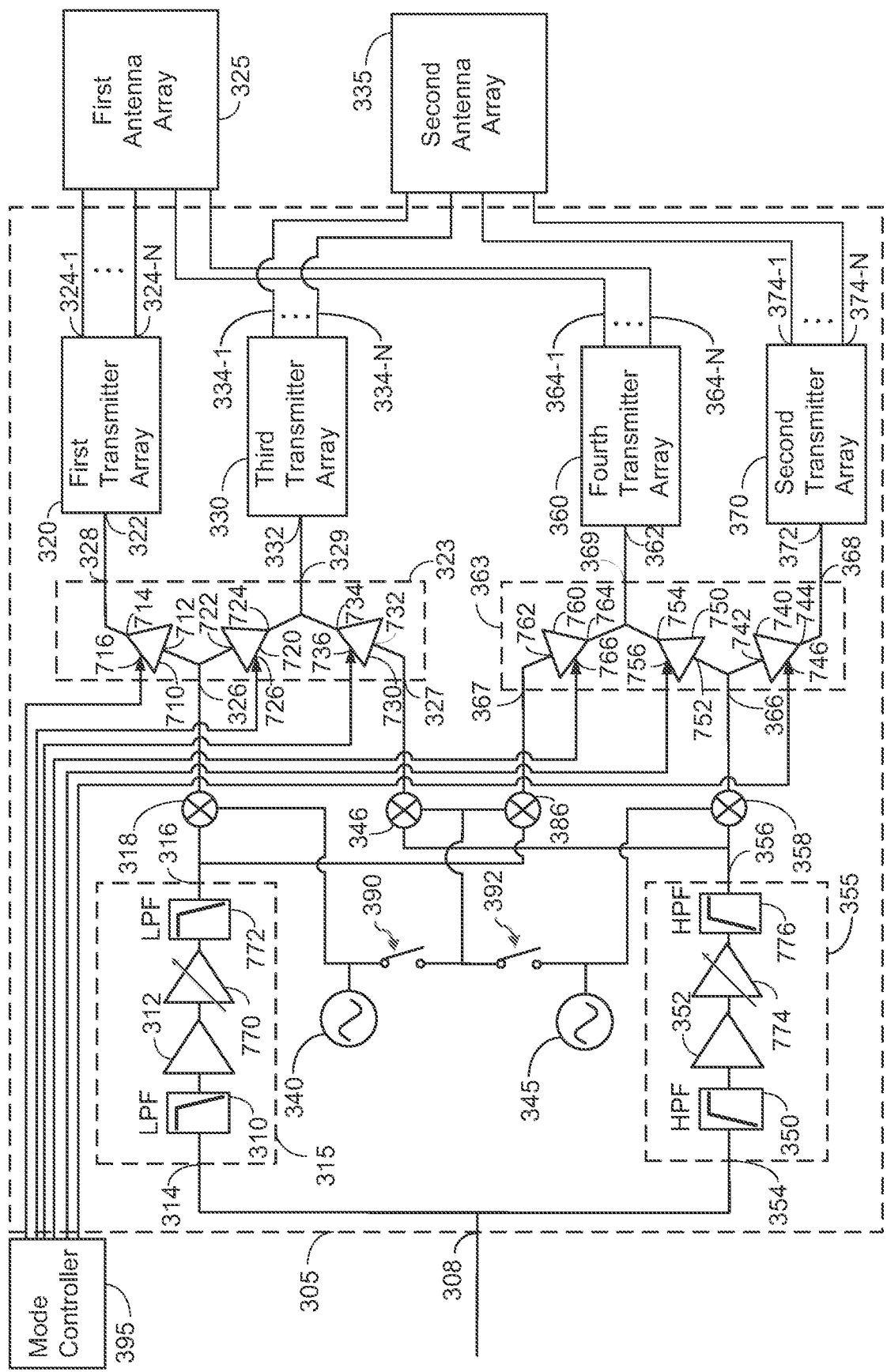
FIG. 7A shows an exemplary implementation of power distribution networks according to certain aspects of the present disclosure.

FIG. 7A shows an exemplary implementation of the first PDN 323 according to certain aspects. In this example, the first PDN 323 includes a third amplifier 710, a fourth amplifier 720, and a fifth amplifier 730. The third amplifier 710 has a signal input 712 coupled to the first input 326, an enable input 716 coupled to the mode controller 395, and an output 714 coupled to the first output 328. The fourth amplifier 720 has a signal input 722 coupled to the first input 326, an enable input 726 coupled to the mode controller 395, and an output 724 coupled to the second output 329. The fifth amplifier 730 has a signal input 732 coupled to the second input 327, an enable input 736 coupled to the mode controller 395, and an output 734 coupled to the second output 329. As discussed further below, in this example, the mode controller 395 is configured to reconfigure the first PDN 323 by selectively enabling or disabling each of the third amplifier 710, the fourth amplifier 720, and the fifth amplifier 730 via the respective enable input 716, 726, and 736. When enabled, each of the third amplifier 710, the fourth amplifier 720, and the fifth amplifier 730 is configured to amplify the signal at the respective signal input 712, 722, and 732 and output the amplified signal at the respective output 714, 724, and 734.

In this example, the second PDN 363 includes a sixth amplifier 740, a seventh amplifier 750, and an eighth amplifier 760. The sixth amplifier 740 has a signal input 742 coupled to the first input 366, an enable input 746 coupled to the mode controller 395, and an output 744 coupled to the first output 368. The seventh amplifier 750 has a signal input 752 coupled to the first input 366, an enable input 756 coupled to the mode controller 395, and an output 754 coupled to the second output 369. The eighth amplifier 760 has a signal input 762 coupled to the second input 367, an enable input 766 coupled to the mode controller 395, and an output 764 coupled to the second output 369. As discussed further below, in this example, the mode controller 395 is configured to reconfigure the second PDN 363 by selectively enabling or disabling each of the sixth amplifier 740, the seventh amplifier 750, and the eighth amplifier 760 via the respective enable input 746, 756, and 766. When enabled, each of the sixth amplifier 740, the seventh amplifier 750, and the eighth amplifier 760 is configured to amplify the signal at the respective signal input 742, 752, and 762 and output the amplified signal at the respective output 744, 754, and 764.

In the first transmit mode, the mode controller 395 enables (i.e., activates) the third amplifier 710, enables the fourth amplifier 720, and disables the fifth amplifier 730 to couple the first input 326 of the first PDN 323 to the first output 328 and the second output 329 of the first PDN 323. The mode controller 395 enables the sixth amplifier 740, enables the seventh amplifier 750, and disables the eighth amplifier 760 to couple the first input 366 of the second PDN 363 to the first output 368 and the second output 369 of the second PDN 363.

In the second transmit mode, the mode controller 395 enables (i.e., activates) the third amplifier 710, disables the fourth amplifier 720, and enables the fifth amplifier 730 to couple the first input 326 of the first PDN 323 to the first output 328 of the first PDN 323 via the third amplifier 710, and couple the second input 327 of the first PDN 323 to the second output 329 of the first PDN 323 via the fifth amplifier 730. The mode controller 395 may also disable the sixth amplifier 740, the seventh amplifier 750, and the eighth amplifier 760 in the second PDN 363.

In the third transmit mode, the mode controller 395 enables (i.e., activates) the sixth amplifier 740, disables the seventh amplifier 750, and enables the eighth amplifier 760 to couple the first input 366 of the second PDN 363 to the first output 368 of the second PDN 363 via the sixth amplifier 740, and couple the second input 367 of the second PDN 363 to the second output 329 of the second PDN 363 via the eighth amplifier 760. The mode controller 395 may also disable the third amplifier 710, the fourth amplifier 720, and the fifth amplifier 730 in the first PDN 323.

Figure 7B:
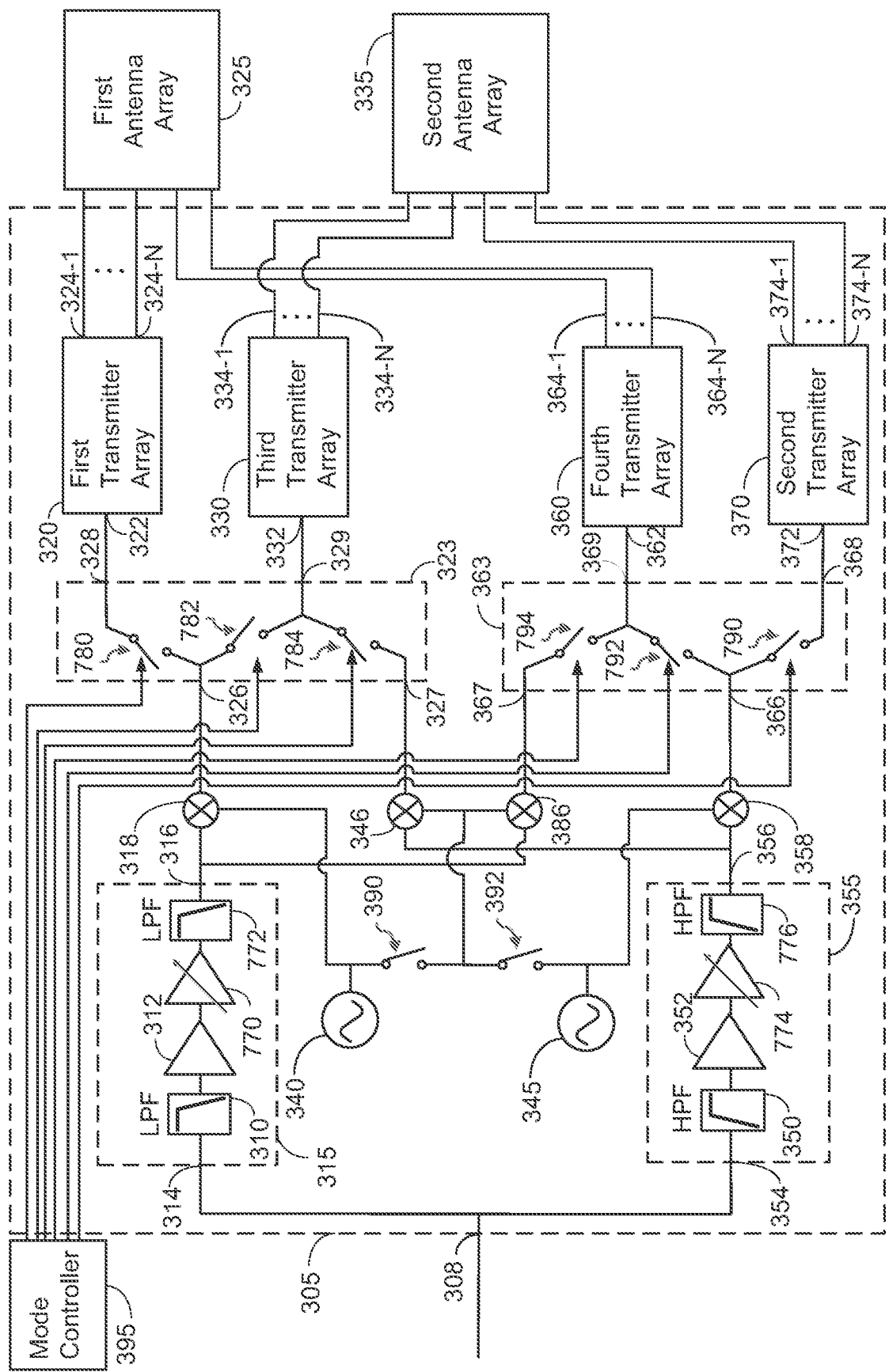
FIG. 7B shows another exemplary implementation of power distribution networks according to certain aspects of the present disclosure.

It is to be appreciated that the first PDN 323 is not limited to the exemplary implementation shown in FIG. 7A. For example, in some implementations, the third amplifier 710, the fourth amplifier 720, and/or the fifth amplifier 730 may be omitted. In these implementations, the first PDN 323 may include switches for providing the first PDN 323 with reconfigurability. In this regard, FIG. 7B shows an example in which the first PDN 323 includes a first switch 780 between the first input 326 and the first output 328, a second switch 782 between the first input 326 and the second output 329, and a third switch 784 between the second input 327 and the second output 329. In this example, the mode controller 395 may reconfigure the first PDN 323 by selectively turning on or off the first switch 780, the second switch 782, and the third switch 784. For example, in the first transmit mode, the mode controller 395 may turn on the first switch 780, turn on the second switch 782, and turn off the third switch 784 to couple the first input 326 to the first output 328 and the second output 329. In the second transmit mode, the mode controller 395 may turn on the first switch 780, turn off the second switch 782, and turn on the third switch 784 to couple the first input 326 to the first output 328 and couple the second input 327 to the second output 329. In other examples, the first PDN 323 may be implemented with a combination of switches and amplifiers. For example, in some implementations, only one or two of the third amplifier 710, the fourth amplifier 720, and the fifth amplifier 730 shown in FIG. 7A may be replaced with the respective one of the first switch 780, the second switch 782, and the third switch 784.

It is to be appreciated that the second PDN 363 is not limited to the exemplary implementation shown in FIG. 7. For example, in some implementations, the sixth amplifier 740, the seventh amplifier 750, and/or the eighth amplifier 760 may be omitted. In this regard, FIG. 7B shows an example in which the second PDN 363 includes a first switch 790 between the first input 366 and the first output 368, a second switch 792 between the first input 366 and the second output 369, and a third switch 794 between the second input 367 and the second output 369. In this example, the mode controller 395 may reconfigure the second PDN 363 by selectively turning on or off the first switch 790, the second switch 792, and the third switch 794. For example, in the first transmit mode, the mode controller 395 may turn on the first switch 790, turn on the second switch 792, and turn off the third switch 794 to couple the first input 366 to the first output 368 and the second output 369. In the third transmit mode, the mode controller 395 may turn on the first switch 790, turn off the second switch 792, and turn on the third switch 794 to couple the first input 366 to the first output 368 and couple the second input 367 to the second output 369. In some examples, the second PDN 363 may be implemented with a combination of switches and amplifiers.

FIGS. 7A and 7B also show an example in which the first signal path 315 further includes a ninth amplifier 770 and a third filter 772 according to certain aspects. In this example, the first filter 310, the first amplifier 312, the ninth amplifier 770, and the third filter 772 are coupled in series between the input 314 and the output 316 of the first signal path 315. The ninth amplifier 770 (e.g., variable-gain amplifier) may be used to increase the gain of the first signal path 315, and the third filter 772 (e.g., LPF) may be used to increase the frequency selectivity of the first signal path 315 (e.g., further suppress the second IF signal 425, 525, or 625).

In the example shown in FIGS. 7A and 7B, the second signal path 355 further includes a tenth amplifier 774 and a fourth filter 776 according to certain aspects. In this example, the second filter 350, the second amplifier 352, the tenth amplifier 774, and the fourth filter 776 are coupled in series between the input 354 and the output 356 of the second signal path 355. The tenth amplifier 774 (e.g., variable-gain amplifier) may be used to increase the gain of the second signal path 355, and the fourth filter 776 (e.g., HPF) may be used to increase the frequency selectivity of the second signal path 355 (e.g., further suppress the first IF signal 420, 520, or 620).

It is to be appreciated that the transmit system 305 may include additional devices not shown in FIGS. 3, 7A, and 7B. For example, in some implementations, the transmit system 305 may include one or more power detectors for measuring transmit power at the outputs of one or more of the transmitter arrays 320, 330, 360, and 370. In another example, the transmit system 305 may include one or more duplexers for switching the antennas of the first antenna array 325 and the second antenna array 335 between the transmit system 305 and a receive system (not shown). In another example, the transmit system 305 may also include a third frequency synthesizer coupled to the third mixer 346 and a fourth synthesizer coupled to the fourth mixer 386 instead of the first switch 390 and the second switch 392. In this example, the third frequency synthesizer may be configured to output a local oscillator to the third mixer 346 in the second transmit mode for upconverting the second IF signal 525 to the second RF signal 555, and the fourth frequency synthesizer may be configured to output a local oscillator to the fourth mixer 386 in the third transmit mode for upconverting first IF signal 620 to the first RF signal 650.

Also, it is to be appreciated that one or more of the devices shown in the examples in FIGS. 3, 7A, and 7B may be omitted in some implementations. For example, for an example where the transmit system 305 does not use the second transmit mode and does not transmit the first RF signal 450 using the third transmitter array 330 in the first transmit mode, the third transmitter array 330, the third mixer 346, the fourth amplifier 720, and the fifth amplifier 730 may be omitted. For an example where the transmit system 305 does not use the third transmit mode and does not transmit the second RF signal 455 using the fourth transmitter array 360 in the first transmit mode, the fourth transmitter array 360, the fourth mixer 386, the seventh amplifier 750, and the eighth amplifier 760 may be omitted.

It is also to be appreciated that the transmit system 305 may share one or more devices with a receive system, for example, to minimize the chip area and share design objective specifications. For example, the transmit system 305 may share the first frequency synthesizer 340 and/or the second frequency synthesizer 345 with the receive system. In another example, the transmit system 305 may share the first filter 310 (e.g., LPF filter) and the second filter 350 (e.g., HPF filter) with the receive system.

Figure 8:
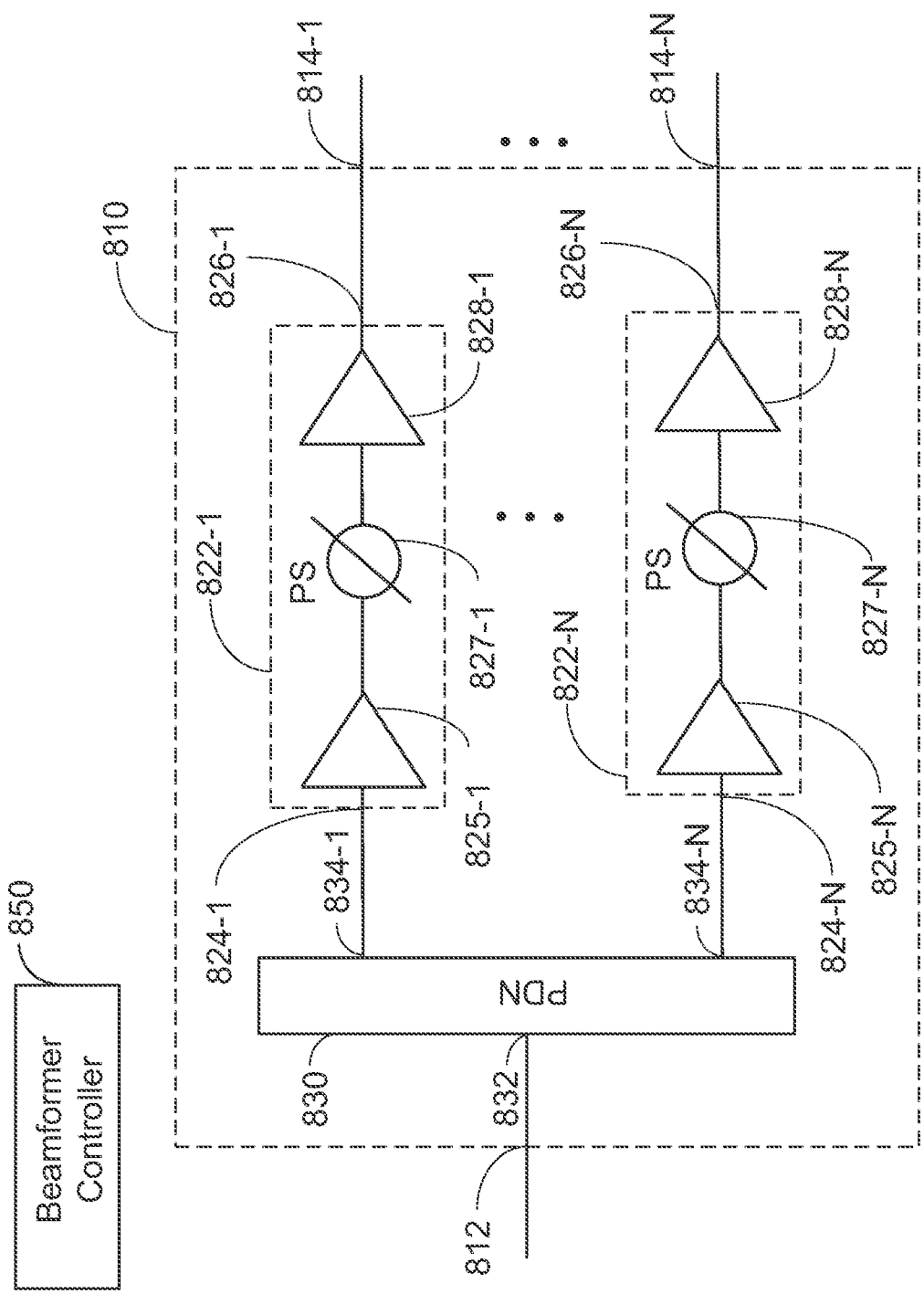
FIG. 8 shows an example of a transmitter array according to certain aspects of the present disclosure.

FIG. 8 shows an exemplary implementation of a transmitter array 810 according to certain aspects. Each of the first transmitter array 320, the second transmitter array 370, the third transmitter array 330, and the fourth transmitter array 360 may be implemented with a separate instance of the exemplary transmitter array 810 in FIG. 8.

In this example, the transmitter array 810 includes a PDN 830 (also referred to as a divider or a splitter) and multiple transmit chains 822-1 to 822-N. The PDN 830 has an input 832 coupled to the input 812 of the transmitter array 810 and multiple outputs 834-1 to 834-N. The PDN 830 is configured to receive a RF signal at the input 832 and split the RF signal into multiple RF signals at the outputs 834-1 to 834-N. Each of the transmit chains 822-1 to 822-N has an input 824-1 to 824-N coupled to a respective one of the outputs 834-1 to 834-N of the PDN 830 and an output 826-1 to 826-N coupled to a respective one of the outputs 814-1 to 814-N of the transmitter array 810.

In the example shown in FIG. 8, each of the transmit chains 822-1 to 822-N includes a respective amplifier 825-1 to 825-N (e.g., variable gain amplifier), a respective phase shifter 827-1 to 827-N, and a respective power amplifier 828-1 to 828-N. In each of the transmit chains 822-1 to 822-N, the input of the respective amplifier 825-1 to 825-N is coupled to the respective output 834-1 to 834-N of the PDN 830, the input of the respective phase shifter 827-1 to 827-N is coupled to the output of the respective amplifier 825-1 to 825-N, the input of the respective power amplifier 828-1 to 828-N is coupled to the output of the respective phase shifter 827-1 to 827-N, and the output of the respective power amplifier 828-1 to 828-N is coupled to the respective output 814-1 to 814-N of the transmitter array 810.

Each of the phase shifters 827-1 to 827-N is configured to shift the phase of the respective RF signal by a respective phase shift to set a transmit beam direction of the respective antenna array (e.g., respective one of the first antenna array 325 and the second antenna array 335). In this regard, a beamformer controller 850 sets the phase shifts of the phase shifters 827-1 to 827-N based on the desired transmit beam direction.

Figure 9:
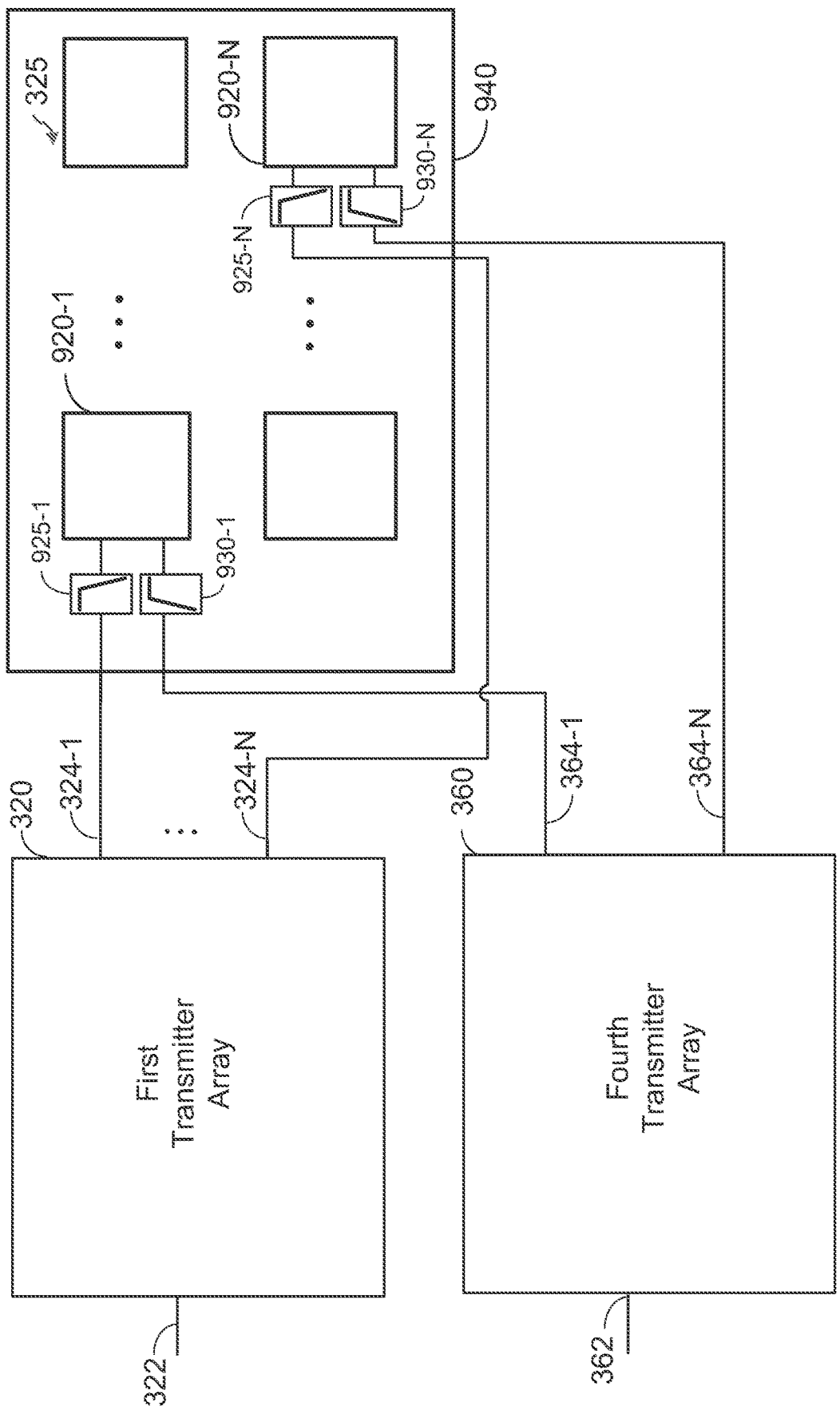
FIG. 9 shows an example of the multi-band transmit system coupled to a first antenna array according to certain aspects of the present disclosure.

FIG. 9 shows an exemplary implementation of the first antenna array 325 according to certain aspects. In this example, the first antenna array 325 includes multiple antennas 920-1 to 920-N (also referred to as antenna elements). Each of the antennas 920-1 to 920-N may be implemented with a patch antenna or another type of antenna, which may be formed on or mounted on a substrate 940 (e.g., printed circuit board or another type of substrate). In this example, each of the antennas 920-1 to 920-N is coupled to a respective one of the outputs 324-1 to 324-N of the first transmitter array 320 and a respective one of the outputs 364-1 to 364-N of the fourth transmitter array 360.

In the example shown in FIG. 9, the system may include first filters 925-1 to 925-N in which each of the first filters 925-1 to 925-N is coupled between a respective one of the antennas 920-1 to 920-N and a respective one of the outputs 324-1 to 324-N of the first transmitter array 320. The system may also include second filters 930-1 to 930-N in which each of the second filters 930-1 to 930-N is coupled between a respective one of the antennas 920-1 to 920-N and a respective one of the outputs 364-1 to 364-N of the fourth transmitter array 360. The first filters 925-1 to 925-N and the second filters 930-1 to 930-N may be formed on or mounted on the substrate 940. Thus, each of the antennas 920-1 to 920-N is coupled to the respective one of the outputs 324-1 to 324-N of the first transmitter array 320 via a respective one of the first filters 925-1 to 925-N and coupled to the respective one of the outputs 364-1 to 364-N of the fourth transmitter array 360 via the respective one of the second filters 930-1 to 930-N.

In certain aspects, the first filters 925-1 to 925-N and the second filters 930-1 to 930-N may be configured to reduce cross talk between the first transmitter array 320 and the fourth transmitter array 360. For the example in which the first transmitter array 320 transmits RF signals in the first band and the fourth transmitter array 360 transmits RF signals in the second band, each of the first filters 925-1 to 925-N may be implemented with a respective LPF configured to pass RF signals in the first band and suppress RF signals in the second band, and each of the second filters 930-1 to 930-N may be implemented with a respective HPF configured to pass RF signals in the second band and suppress RF signals in the first band.

Figure 10:
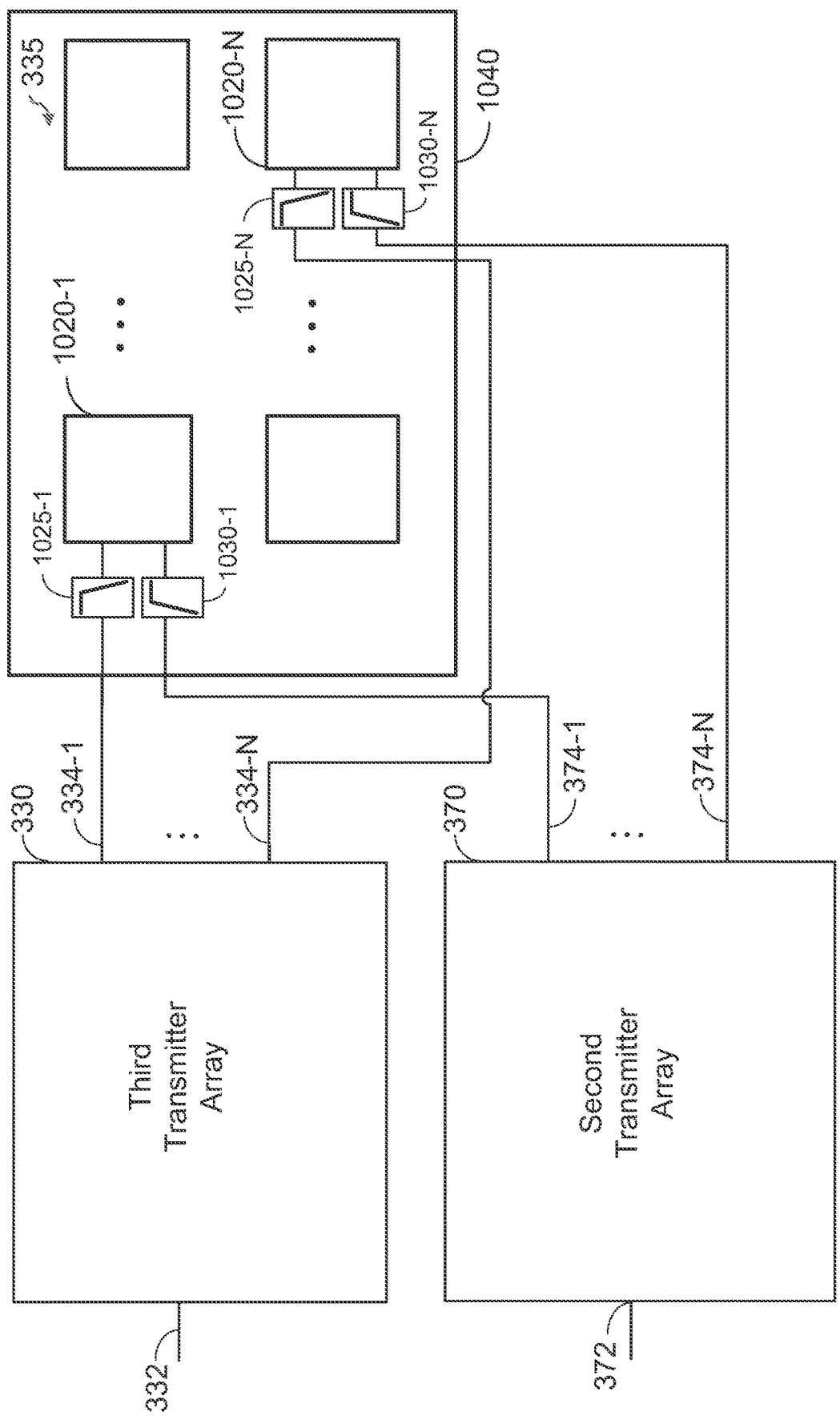
FIG. 10 shows an example of the multi-band transmit system coupled to a second antenna array according to certain aspects of the present disclosure.

FIG. 10 shows an exemplary implementation of the second antenna array 335 according to certain aspects. In this example, the second antenna array 335 includes multiple antennas 1020-1 to 1020-N (also referred to as antenna elements). Each of the antennas 1020-1 to 1020-N may be implemented with a patch antenna or another type of antenna, which may be formed on or mounted on a substrate 1040 (e.g., printed circuit board or another type of substrate). In this example, each of the antennas 1020-1 to 1020-N is coupled to a respective one of the outputs 334-1 to 334-N of the third transmitter array 330 and a respective one of the outputs 374-1 to 374-N of the second transmitter array 370. In some implementations, the substrate 1040 and the substrate 940 may be the same substrate in which case the antennas 920-1 to 920-N and 1020-1 to 1020-N are on a common substrate. In other implementations, the substrates 1040 and 940 may be separate.

In the example shown in FIG. 10, the system includes first filters 1025-1 to 1025-N in which each of the first filters 1025-1 to 1025-N is coupled between a respective one of the antennas 1020-1 to 1020-N and a respective one of the outputs 334-1 to 334-N of the third transmitter array 330. The system may also include second filters 1030-1 to 1030-N in which each of the second filters 1030-1 to 1030-N is coupled between a respective one of the antennas 1020-1 to 1020-N and a respective one of the outputs 374-1 to 374-N of the second transmitter array 370. The first filters 1025-1 to 1025-N and the second filters 1030-1 to 1030-N may be formed on or mounted on the substrate 1040. Thus, each of the antennas 1020-1 to 1020-N is coupled to the respective one of the outputs 334-1 to 334-N of the third transmitter array 330 via a respective one of the first filters 1025-1 to 1025-N and coupled to the respective one of the outputs 374-1 to 374-N of the second transmitter array 370 via the respective one of the second filters 1030-1 to 1030-N.

In certain aspects, the first filters 1025-1 to 1025-N and the second filters 1030-1 to 1030-N may be configured to reduce cross talk between the third transmitter array 330 and the second transmitter array 370. For the example in which the third transmitter array 330 transmits RF signals in the first band and the second transmitter array 370 transmits RF signals in the second band, each of the first filters 1025-1 to 1025-N may be implemented with a respective LPF configured to pass RF signals in the first band and suppress RF signals in the second band, and each of the second filters 1030-1 to 1030-N may be implemented with a respective HPF configured to pass RF signals in the second band and suppress RF signals in the first band.

Although the transmitter arrays 320, 330, 360, and 370 are shown in the examples in FIGS. 3 and 7 having the same number (i.e., N) of outputs, it is to be appreciated that this need not be the case and that the transmitter arrays 320, 330, 360, and 370 may have different numbers of outputs. Also, it is to be appreciated that the first antenna array 325 and the second antenna array 335 may have different numbers of antennas.

Figure 11:
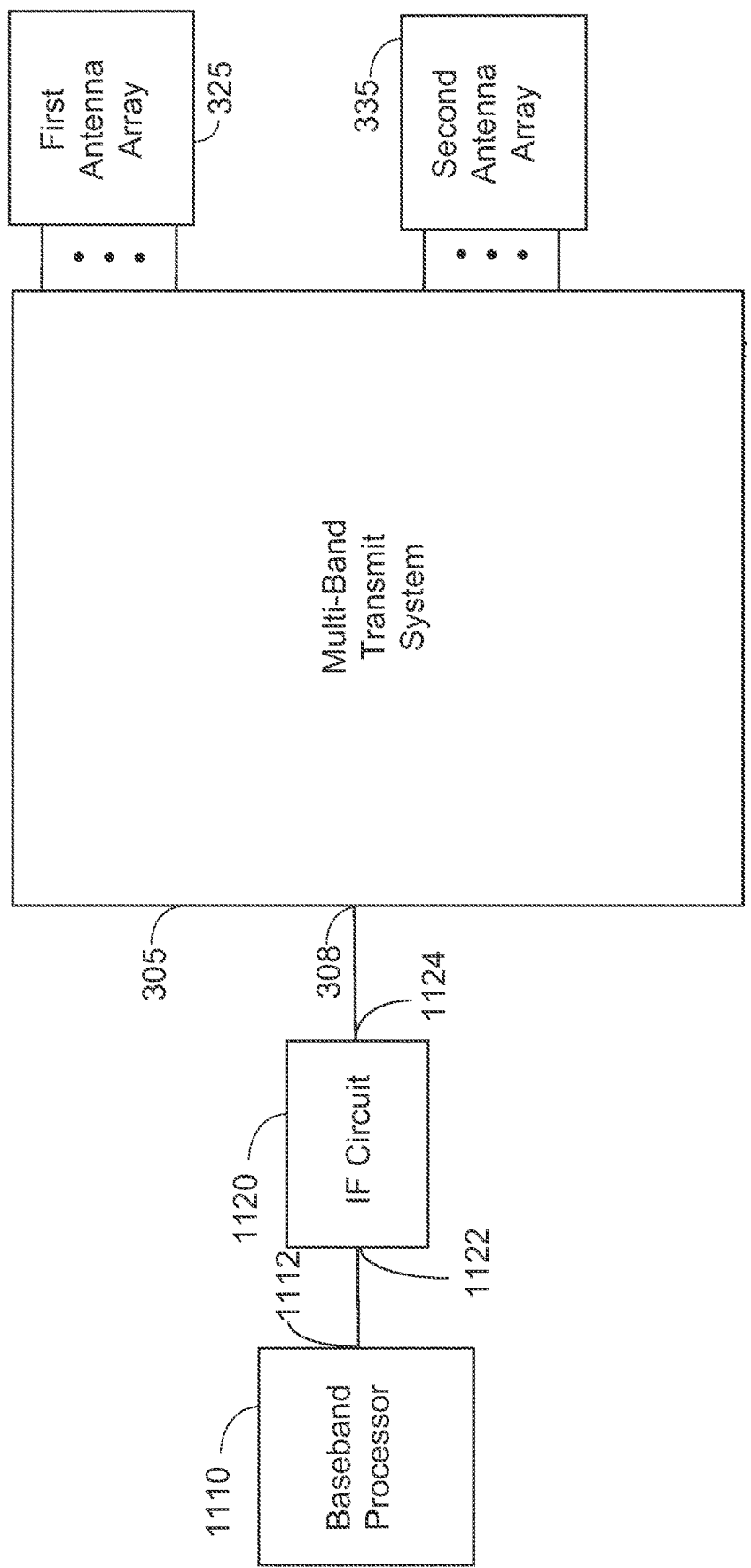
FIG. 11 shows an example of an IF circuit coupled to an input of the multi-band transmit system according to certain aspects of the present disclosure.

FIG. 11 shows an example of a system including the multi-band transmit system 305, the first antenna array 325, and the second antenna array 335. The system also includes an IF circuit 1120, and a baseband processor 1110 (also referred to as a modem). The IF circuit 1120 has an input 1122 coupled to an output 1112 of the baseband processor 1110, and an output 1124 coupled to the input 308 of the multi-band transmit system 305.

In this example, the baseband processor 1110 is configured to receive data signals and/or control signals and process the data signals and/or control signals into baseband signals. The processing by the baseband processor 1110 may include coding and/or modulating the data signals and/or control signals. The baseband processor 1110 outputs the baseband signals at the output 1112.

The IF circuit 1120 is configured to convert the baseband signals into IF signals (e.g., IF signals 420, 425, 520, 525, 620, and/or 625) and output the IF signals to the transmit system 305 from the output 1124. For example, the IF circuit 1120 may convert the baseband signals into the IF signals by frequency upconverting the baseband signals. In this example, the IF circuit 1120 may include mixers (not shown) for mixing the baseband signals with one or more LO signals to frequency upconvert the baseband signals into the IF signals. The IF signals have frequencies between the frequencies of the RF signals transmitted by the transmit system 305 and baseband. In some implementations, the IF circuit 1120 and the transmit system 305 may be integrated on separate chips in which the output 1124 of the IF circuit 1120 is coupled to the input 308 of the transmit system 305 via a cable or a transmission line.

Figure 12:
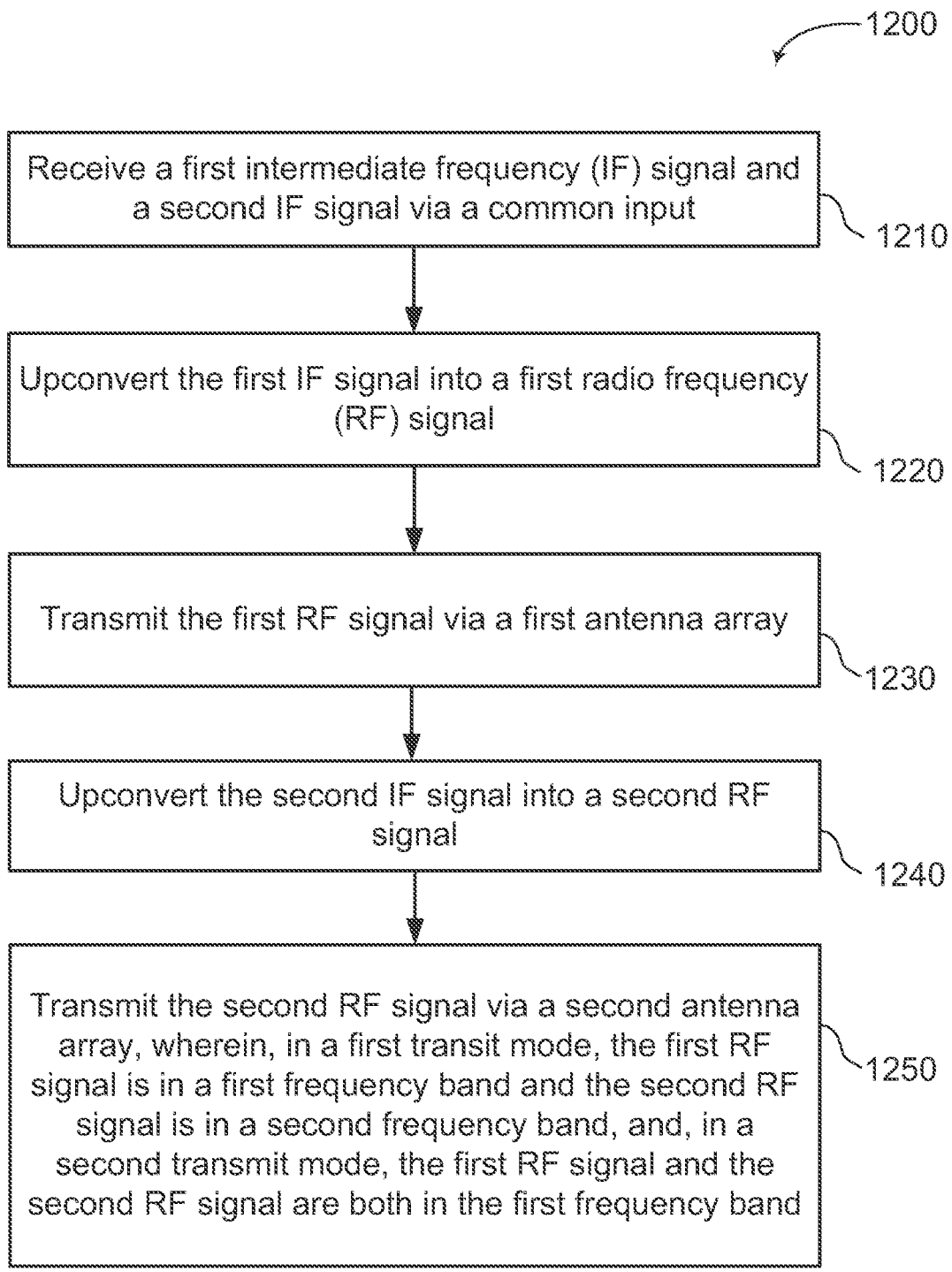
FIG. 12 shows a flowchart illustrating a method for transmission according to certain aspects of the present disclosure.

FIG. 12 illustrates a method 1200 for transmission according to certain aspects of the present disclosure. The method 1200 may be performed, for example, by the transmit system 305.

At block 1210, a first intermediate frequency (IF) signal and a second IF signal are received via a common input. For example, the common input may correspond to the IF input 308. The first IF signal and the second IF signal may come from an IF circuit (e.g., IF circuit 1120).

At block 1220, the first IF signal is upconverted into a first radio frequency (RF) signal. For example, the first IF signal may be upconverted by the first mixer 318.

At block 1230, the first RF signal is transmitted via a first antenna array. For example, the first RF signal may be transmitted via the first antenna array (e.g., first antenna array 325) by the first transmitter array 320.

At block 1240, the second IF signal is upconverted into a second RF signal. For example, the second IF signal may be upconverted by the second mixer 358.

At block 1250, the second RF signal is transmitted via a second antenna array, wherein, in a first transit mode, the first RF signal is in a first frequency band and the second RF signal is in a second frequency band, and, in a second transmit mode, the first RF signal and the second RF signal are both in the first frequency band. For example, the second RF signal may be transmitted via the second antenna array (e.g., second antenna array 335) by the second transmitter array 370.

In one example, the first frequency band is within a frequency range of 24 GHz to 29 GHz and the second frequency band is within a frequency range of 37 GHz to 48 GHz. However, it is to be appreciated that the first frequency band and the second frequency band are not limited to this example.

In certain aspects, the method 1200 may also include, in the first transmit mode, transmitting the first RF signal via the second antenna array and transmitting the second RF signal via the first antenna array. For example, the first RF signal may be transmitted via the second antenna array by the third transmitter array 330 and the second RF signal may be transmitted via the first antenna array by the fourth transmitter array 360.

In certain aspects, in a third transmit mode, the first RF signal and the second RF are both in the second frequency band.

In certain aspects, transmitting the first RF signal via the first antenna array may include routing the first RF signal to an input of a first transmitter array (e.g., first transmitter array 320) coupled to the first antenna array, and transmitting the second RF signal via the second antenna array may include routing the second RF signal to an input of a second transmitter array (e.g., second transmitter array 370) coupled to the second antenna array in the first transmit mode, and routing the second RF signal to an input of a third transmitter array (e.g., third transmitter array 330) coupled to the second antenna array in the second transmit mode. For example, the first RF signal may be routed by the first PDN 323, and the second RF signal may be routed by the second PDN 363 in the first transmit mode and routed by the first PDN 323 in the second transmit mode.

The mode controller 395 discussed above may be implemented with a general-purpose processor, a digital signal processor (DSP), an application specific integrated circuit (ASIC), a field programmable gate array (FPGA) or other programmable logic device, discrete hardware components (e.g., logic gates), or any combination thereof designed to perform the functions described herein. A processor may perform the functions described herein by executing software comprising code for performing the functions. The software may be stored on a computer-readable storage medium, such as a RAM, a ROM, an EEPROM, an optical disk, and/or a magnetic disk.

Implementation examples are described in the following numbered clauses:

1. An apparatus, comprising:
   a first signal path having an input and an output, wherein the input of the first signal path is coupled to an intermediate frequency (IF) input, and the first signal path comprises a first filter configured to pass a first IF signal and suppress a second IF signal;
   a second signal path having an input and an output, wherein the input of the second signal path is coupled to the IF input, and the second signal path comprises a second filter configured to pass the second IF signal and suppress the first IF signal;
   a first transmitter array having an input and multiple outputs;
   a second transmitter array having an input and multiple outputs;
   a third transmitter array having an input and multiple outputs;
   a first power distribution network (PDN) having a first input, a second input, a first output coupled to the input of the first transmitter array, and a second output coupled to the input of the third transmitter array;
   a first mixer coupled between the output of the first signal path and the first input of the first PDN;
   a second mixer coupled between the output of the second signal path and the input of the second transmitter array; and
   a third mixer coupled between the output of the second signal path and the second input of the first PDN.

2. The apparatus of clause 1, wherein:
   the first filter includes a low-pass filter; and
   the second filter includes a high-pass filter.

3. The apparatus of clause 2, wherein:
   the first signal path further comprises a first amplifier coupled in series with the first filter; and
   the second signal path further comprises a second amplifier coupled in series with the second filter.

4. The apparatus of any one of clauses 1 to 3, further comprising a controller coupled to the first PDN, wherein the controller is configured to:
   in a first transmit mode, cause the first PDN to couple the first input of the first PDN to the first output of the first PDN and the second output of the first PDN; and
   in a second transmit mode, cause the first PDN to couple the second input of the first PDN to the second output of the first PDN.

5. The apparatus of clause 4, wherein the controller is configured to cause the first PDN to operate in the first transmit mode during a carrier aggregation mode.

6. The apparatus of any one of clauses 1 to 5, wherein the first PDN comprises:
   a first amplifier coupled between the first input of the first PDN and the first output of the PDN;
   a second amplifier coupled between the first input of the PDN and the second output of the PDN; and
   a third amplifier coupled between the second input of the first PDN and the second output of the first PND.

7. The apparatus of clause 6, further comprising a controller, wherein, in a first transmit mode, the controller is configured to enable the first amplifier, enable the second amplifier, and disable the third amplifier.

8. The apparatus of clause 7, wherein, in a second transmit mode, the controller is configured to enable the first amplifier, disable the second amplifier, and enable the third amplifier.

9. The apparatus of any one of clauses 1 to 8, further comprising:
   a fourth transmitter array having an input and multiple outputs;
   a second PDN having a first input, a second input, a first output coupled to the input of the second transmitter array, and a second output coupled to the input of the fourth transmitter array, wherein the second mixer is coupled between the output of the second signal path and the first input of the second PDN; and
   a fourth mixer coupled between the output of the first signal path and the second input of the second PDN.

10. The apparatus of clause 9, further comprising a controller coupled to the first PDN and the second PDN, wherein the controller is configured to:
    in a first transmit mode, cause the first PDN to couple the first input of the first PDN to the second output of the first PDN, and cause the second PDN to couple the first input of the second PDN to the second output of the second PDN;
    in a second transmit mode, cause the first PDN to couple the second input of the first PDN to the second output of the first PDN; and
    in a third transmit mode, cause the second PDN to couple the second input of the second PDN to the second output of the second PDN.

11. The apparatus of clause 10, wherein, in the first transmit mode, the controller is configured to cause the first PDN to couple the first input of the first PDN to the first output of the first PDN and cause the second PDN to couple the first input of the second PDN to the first output of the second PDN.

12. The apparatus of any one of clauses 9 to 11, further comprising:
    a first frequency synthesizer coupled to the first mixer;
    a second frequency synthesizer coupled to the second mixer;
    a first switch coupled between the first frequency synthesizer and the fourth mixer; and
    a second switch coupled between the second frequency synthesizer and the third mixer.

13. The apparatus of any one of clauses 9 to 12, wherein the first PDN comprises:
    a first amplifier coupled between the first input of the first PDN and the first output of the first PDN;
    a second amplifier coupled between the first input of the first PDN and the second output of the first PDN; and a third amplifier coupled between the second input of the first PDN and the second output of the first PND.

14. The apparatus of clause 13, wherein the second PDN comprises:
   a fourth amplifier coupled between the first input of the second PDN and the first output of the second PDN;
   a fifth amplifier coupled between the first input of the second PDN and the second output of the second PDN; and
   a sixth amplifier coupled between the second input of the second PDN and the second output of the second PND.

15. The apparatus of clause 14, further comprising a controller, wherein:
   in a first transmit mode, the controller is configured to enable the first amplifier, enable the second amplifier, disable the third amplifier, enable the fourth amplifier, enable the fifth amplifier, and disable the sixth amplifier;
   in a second transmit mode, the controller is configured to enable the first amplifier, disable the second amplifier, and enable the third amplifier; and
   in a third transmit mode, the controller is configured to enable the fourth amplifier, disable the fifth amplifier, and enable the sixth amplifier.

16. The apparatus of any one of clauses 9 to 15, further comprising a first antenna array including first antennas, wherein each of the first antennas is coupled to a respective one of the outputs of the first transmitter array and a respective one of the outputs of the fourth transmitter array.

17. The apparatus of clause 16, further comprising a second antenna array including second antennas, wherein each of the second antennas is coupled to a respective one of the outputs of the third transmitter array and a respective one of the outputs of the second transmitter array.

18. The apparatus of clause 16 or 17, further comprising:
   first filters; and
   second filters;
   wherein each of the first antennas is coupled to the respective one of the outputs of the first transmitter array via a respective one of the first filters and coupled to the respective one of the outputs of the fourth transmitter array via a respective one of the second filters.

19. The apparatus of any one of clauses 1 to 18, further comprising:
   a baseband processor; and
   an IF circuit coupled between the baseband processor and the IF input.

20. The apparatus of any one of clauses 1 to 19, wherein the first transmitter array comprises:
   a second PDN having an input and multiple outputs, wherein the input of the second PDN is coupled to the input of the first transmitter array; and
   multiple transmits chains, wherein each of the transmit chains is coupled between a respective one of the outputs of the second PDN and a respective one of the outputs of the first transmitter array, and wherein each of the transmit chains comprises a respective phase shifter.

21. A method for transmission, comprising:
   receiving a first intermediate frequency (IF) signal and a second IF signal via a common input;
   upconverting the first IF signal into a first radio frequency (RF) signal;
   transmitting the first RF signal via a first antenna array;
   upconverting the second IF signal into a second RF signal; and
   transmitting the second RF signal via a second antenna array;
   wherein, in a first transit mode, the first RF signal is in a first frequency band and the second RF signal is in a second frequency band; and
   wherein, in a second transmit mode, the first RF signal and the second RF signal are both in the first frequency band.

22. The method of clause 21, further comprising, in the first transmit mode, transmitting the first RF signal via the second antenna array and transmitting the second RF signal via the first antenna array.

23. The method of clause 21 or 22, wherein, in a third transmit mode, the first RF signal and the second RF signal are both in the second frequency band.

24. The method of any one of clauses 21 to 23, wherein the first frequency band is within a frequency range of 24 GHz to 29 GHz and the second frequency band is within a frequency range of 37 GHz to 48 GHz.

25. The method of any one of clauses 21 to 24, wherein:
   transmitting the first RF signal via the first antenna array comprises routing the first RF signal to an input of a first transmitter array coupled to the first antenna array; and
   transmitting the second RF signal via the second antenna array comprises:
      routing the second RF signal to an input of a second transmitter array coupled to the second antenna array in the first transmit mode; and
      routing the second RF signal to an input of a third transmitter array coupled to the second antenna array in the second transmit mode.

26. An apparatus, comprising:
   a first signal path having an input and an output, wherein the first signal path comprises a first filter;
   a second signal path having an input and an output, wherein the second signal path comprises a second filter, and the input of the first signal path and the input of the second signal path are coupled to a common input;
   a first transmitter array having an input and multiple outputs;
   a second transmitter array having an input and multiple outputs;
   a third transmitter array having an input and multiple outputs;
   a first mixer coupled to the output of the first signal path;
   a second mixer coupled to the output of the second signal path;
   a third mixer coupled to the output of the second signal path;
   means for coupling the first mixer to the input of the first transmitter array in a first transmit mode and a second transmit mode;
   means for coupling the second mixer to the input of the second transmitter array in the first transmit mode; and
   means for coupling the third mixer to the input of the third transmitter array in the second transmit mode.

27. The apparatus of clause 26, further comprising:
   a fourth transmitter array having an input and multiple outputs;
   a fourth mixer coupled to the output of the first signal path; and
   means for coupling the fourth mixer to the input of the fourth transmitter array in a third transmit mode;
   wherein the means for coupling the second mixer to the input of the second transmitter array in the first transmit mode couples the second mixer to the input of the second transmitter array in the third transmit mode.

28. The apparatus of clause 27, further comprising a first antenna array including first antennas, wherein each of the first antennas is coupled to a respective one of the outputs of the first transmitter array and a respective one of the outputs of the fourth transmitter array.

29. The apparatus of clause 28, further comprising a second antenna array including second antennas, wherein each of the second antennas is coupled to a respective one of the outputs of the third transmitter array and a respective one of the outputs of the second transmitter array.

Any reference to an element herein using a designation such as "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect electrical coupling between two structures.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus, comprising:
a first signal path having an input and an output, wherein the input of the first signal path is coupled to an intermediate frequency (IF) input, and the first signal path comprises a first filter configured to pass a first IF signal and suppress a second IF signal;
a second signal path having an input and an output, wherein the input of the second signal path is coupled to the IF input, and the second signal path comprises a second filter configured to pass the second IF signal and suppress the first IF signal;
a first transmitter array having an input and multiple outputs;
a second transmitter array having an input and multiple outputs;
a third transmitter array having an input and multiple outputs;
a first power distribution network (PDN) having a first input, a second input, a first output coupled to the input of the first transmitter array, and a second output coupled to the input of the third transmitter array;
a first mixer coupled between the output of the first signal path and the first input of the first PDN;
a second mixer coupled between the output of the second signal path and the input of the second transmitter array; and
a third mixer coupled between the output of the second signal path and the second input of the first PDN.

2. The apparatus of claim 1, wherein:
the first filter includes a low-pass filter; and
the second filter includes a high-pass filter.

3. The apparatus of claim 2, wherein:
the first signal path further comprises a first amplifier coupled in series with the first filter; and
the second signal path further comprises a second amplifier coupled in series with the second filter.

4. The apparatus of claim 1, further comprising a controller coupled to the first PDN, wherein the controller is configured to:
in a first transmit mode, cause the first PDN to couple the first input of the first PDN to the first output of the first PDN and the second output of the first PDN; and
in a second transmit mode, cause the first PDN to couple the second input of the first PDN to the second output of the first PDN.

5. The apparatus of claim 4, wherein the controller is configured to cause the first PDN to operate in the first transmit mode during a carrier aggregation mode.

6. The apparatus of claim 1, wherein the first PDN comprises:
a first amplifier coupled between the first input of the first PDN and the first output of the first PDN;
a second amplifier coupled between the first input of the first PDN and the second output of the first PDN; and
a third amplifier coupled between the second input of the first PDN and the second output of the first PDN.

7. The apparatus of claim 6, further comprising a controller, wherein, in a first transmit mode, the controller is configured to enable the first amplifier, enable the second amplifier, and disable the third amplifier.

8. The apparatus of claim 7, wherein, in a second transmit mode, the controller is configured to enable the first amplifier, disable the second amplifier, and enable the third amplifier.

9. The apparatus of claim 1, further comprising:
a baseband processor; and
an IF circuit coupled between the baseband processor and the IF input.

10. The apparatus of claim 1, wherein the first transmitter array comprises:
a second PDN having an input and multiple outputs, wherein the input of the second PDN is coupled to the input of the first transmitter array; and
multiple transmits chains, wherein each of the transmit chains is coupled between a respective one of the outputs of the second PDN and a respective one of the outputs of the first transmitter array, and wherein each of the transmit chains comprises a respective phase shifter.

11. An apparatus, comprising:
a first signal path having an input and an output, wherein the input of the first signal path is coupled to an intermediate frequency (IF) input, and the first signal path comprises a first filter configured to pass a first IF signal and suppress a second IF signal;
a second signal path having an input and an output, wherein the input of the second signal path is coupled to the IF input, and the second signal path comprises a second filter configured to pass the second IF signal and suppress the first IF signal;
a first transmitter array having an input and multiple outputs;

a second transmitter array having an input and multiple outputs;
a third transmitter array having an input and multiple outputs;
a fourth transmitter array having an input and multiple outputs;
a first power distribution network (PDN) having a first input, a second input, a first output coupled to the input of the first transmitter array, and a second output coupled to the input of the third transmitter array;
a second PDN having a first input, a second input, a first output coupled to the input of the second transmitter array, and a second output coupled to the input of the fourth transmitter array;
a first mixer coupled between the output of the first signal path and the first input of the first PDN;
a second mixer coupled between the output of the second signal path and the first input of the second PDN;
a third mixer coupled between the output of the second signal path and the second input of the first PDN; and
a fourth mixer coupled between the output of the first signal path and the second input of the second PDN.

12. The apparatus of claim 11, further comprising a controller coupled to the first PDN and the second PDN, wherein the controller is configured to:
in a first transmit mode, cause the first PDN to couple the first input of the first PDN to the second output of the first PDN, and cause the second PDN to couple the first input of the second PDN to the second output of the second PDN;
in a second transmit mode, cause the first PDN to couple the second input of the first PDN to the second output of the first PDN; and
in a third transmit mode, cause the second PDN to couple the second input of the second PDN to the second output of the second PDN.

13. The apparatus of claim 12, wherein, in the first transmit mode, the controller is configured to cause the first PDN to couple the first input of the first PDN to the first output of the first PDN and cause the second PDN to couple the first input of the second PDN to the first output of the second PDN.

14. The apparatus of claim 11, further comprising:
a first frequency synthesizer coupled to the first mixer;
a second frequency synthesizer coupled to the second mixer;
a first switch coupled between the first frequency synthesizer and the fourth mixer; and
a second switch coupled between the second frequency synthesizer and the third mixer.

15. The apparatus of claim 11, wherein the first PDN comprises:
a first amplifier coupled between the first input of the first PDN and the first output of the first PDN;
a second amplifier coupled between the first input of the first PDN and the second output of the first PDN; and
a third amplifier coupled between the second input of the first PDN and the second output of the first PDN.

16. The apparatus of claim 15, wherein the second PDN comprises:
a fourth amplifier coupled between the first input of the second PDN and the first output of the second PDN;
a fifth amplifier coupled between the first input of the second PDN and the second output of the second PDN; and
a sixth amplifier coupled between the second input of the second PDN and the second output of the second PDN.

17. The apparatus of claim 16, further comprising a controller, wherein:
in a first transmit mode, the controller is configured to enable the first amplifier, enable the second amplifier, disable the third amplifier, enable the fourth amplifier, enable the fifth amplifier, and disable the sixth amplifier;
in a second transmit mode, the controller is configured to enable the first amplifier, disable the second amplifier, and enable the third amplifier; and
in a third transmit mode, the controller is configured to enable the fourth amplifier, disable the fifth amplifier, and enable the sixth amplifier.

18. The apparatus of claim 11, further comprising a first antenna array including first antennas, wherein each of the first antennas is coupled to a respective one of the outputs of the first transmitter array and a respective one of the outputs of the fourth transmitter array.

19. The apparatus of claim 18, further comprising a second antenna array including second antennas, wherein each of the second antennas is coupled to a respective one of the outputs of the third transmitter array and a respective one of the outputs of the second transmitter array.

20. The apparatus of claim 18, further comprising:
first filters; and
second filters;
wherein each of the first antennas is coupled to the respective one of the outputs of the first transmitter array via a respective one of the first filters and coupled to the respective one of the outputs of the fourth transmitter array via a respective one of the second filters.

21. A method for transmission, comprising:
receiving a first intermediate frequency (IF) signal and a second IF signal via a common input;
upconverting the first IF signal into a first radio frequency (RF) signal;
transmitting the first RF signal via a first antenna array;
upconverting the second IF signal into a second RF signal; and
transmitting the second RF signal via a second antenna array;
wherein, in a first transit mode, the first RF signal is in a first frequency band and the second RF signal is in a second frequency band;
wherein, in a second transmit mode, the first RF signal and the second RF signal are both in the first frequency band; and
wherein, in a third transmit mode, the first RF signal and the second RF signal are both in the second frequency band.

22. The method of claim 21, further comprising, in the first transmit mode, transmitting the first RF signal via the second antenna array and transmitting the second RF signal via the first antenna array.

23. The method of claim 21, wherein the first frequency band is within a frequency range of 24 GHz to 29 GHz and the second frequency band is within a frequency range of 37 GHz to 48 GHz.

24. The method of claim 21, wherein:
transmitting the first RF signal via the first antenna array comprises routing the first RF signal to an input of a first transmitter array coupled to the first antenna array; and
transmitting the second RF signal via the second antenna array comprises:

routing the second RF signal to an input of a second transmitter array coupled to the second antenna array in the first transmit mode; and routing the second RF signal to an input of a third transmitter array coupled to the second antenna array in the second transmit mode.

25. An apparatus, comprising:
a first signal path having an input and an output, wherein the first signal path comprises a first filter;
a second signal path having an input and an output, wherein the second signal path comprises a second filter, and the input of the first signal path and the input of the second signal path are coupled to a common input;
a first transmitter array having an input and multiple outputs;
a second transmitter array having an input and multiple outputs;
a third transmitter array having an input and multiple outputs;
a first mixer coupled to the output of the first signal path;
a second mixer coupled to the output of the second signal path;
a third mixer coupled to the output of the second signal path;
means for coupling the first mixer to the input of the first transmitter array in a first transmit mode and a second transmit mode;
means for coupling the second mixer to the input of the second transmitter array in the first transmit mode; and
means for coupling the third mixer to the input of the third transmitter array in the second transmit mode.

26. The apparatus of claim 25, further comprising:
a fourth transmitter array having an input and multiple outputs;
a fourth mixer coupled to the output of the first signal path; and
means for coupling the fourth mixer to the input of the fourth transmitter array in a third transmit mode;
wherein the means for coupling the second mixer to the input of the second transmitter array in the first transmit mode couples the second mixer to the input of the second transmitter array in the third transmit mode.

27. The apparatus of claim 26, further comprising a first antenna array including first antennas, wherein each of the first antennas is coupled to a respective one of the outputs of the first transmitter array and a respective one of the outputs of the fourth transmitter array.

28. The apparatus of claim 27, further comprising a second antenna array including second antennas, wherein each of the second antennas is coupled to a respective one of the outputs of the third transmitter array and a respective one of the outputs of the second transmitter array.

* * * * *